United States Patent [19]

Rohner

[11] 4,291,380
[45] Sep. 22, 1981

[54] RESOLVABILITY TEST AND PROJECTION SIZE CLIPPING FOR POLYGON FACE DISPLAY

[75] Inventor: Michel Rohner, San Jose, Calif.

[73] Assignee: The Singer Company, Binghamton, N.Y.

[21] Appl. No.: 38,617

[22] Filed: May 14, 1979

[51] Int. Cl.³ .......................... G09B 9/08; H04N 7/18
[52] U.S. Cl. .................................... 364/522; 358/103; 434/38
[58] Field of Search ....................... 364/515, 521, 522; 35/10.24

[56] References Cited

U.S. PATENT DOCUMENTS

| | | | |
|---|---|---|---|
| 4,179,823 | 12/1979 | Sullivan et al. | 35/10.24 |
| 4,179,824 | 12/1979 | Marsh | 35/10.24 |
| 4,181,953 | 1/1980 | Osofsky | 364/515 |
| 4,208,719 | 6/1980 | Lotz et al. | 364/515 |

*Primary Examiner*—Felix D. Gruber
*Attorney, Agent, or Firm*—J. Dennis Moore; Douglas M. Clarkson; Jeff Rothenberg

[57] ABSTRACT

A flight simulator combines flight data and polygon face terrain data to provide a CRT display for the windows of an aircraft trainer. The data base contains position data defining the relative position of each vertex of each polygon face, and visual data concerning the color, intensity, etc. of each face. In addition, the data base contains resolvability data for determining which faces, as displayed on the CRT, would have dimensions less than the resolvability of the display system. The resolvability standard is defined by a resolvability code (RC) and is based on the smallest resolvable angular subtense ($\theta rc$). The angular subtenses ($\theta$ major and $\theta$ minor) of each face is determined by representing each face by a rectangle having a long side (S major) and a short side (S minor), and combining these side values with o (the S major unit vector) and n (the unit vector normal to the plane of S major and S minor) in a trigonometric relationship. $\theta$ major is compared with $\theta$ minor and the smaller of the two, $\theta$ min is compared with $\theta rc$ to determine whether that face is below the visibility threshold and should be dropped from further processing.

12 Claims, 23 Drawing Figures

Fig_1

Fig_3
TRANSLATION STAGE 60

Fig_4
ROTATION STAGE 62

Fig_5
CLIPPING STAGE 63

PROJECTION STAGE 64

EDGE STAGE 65

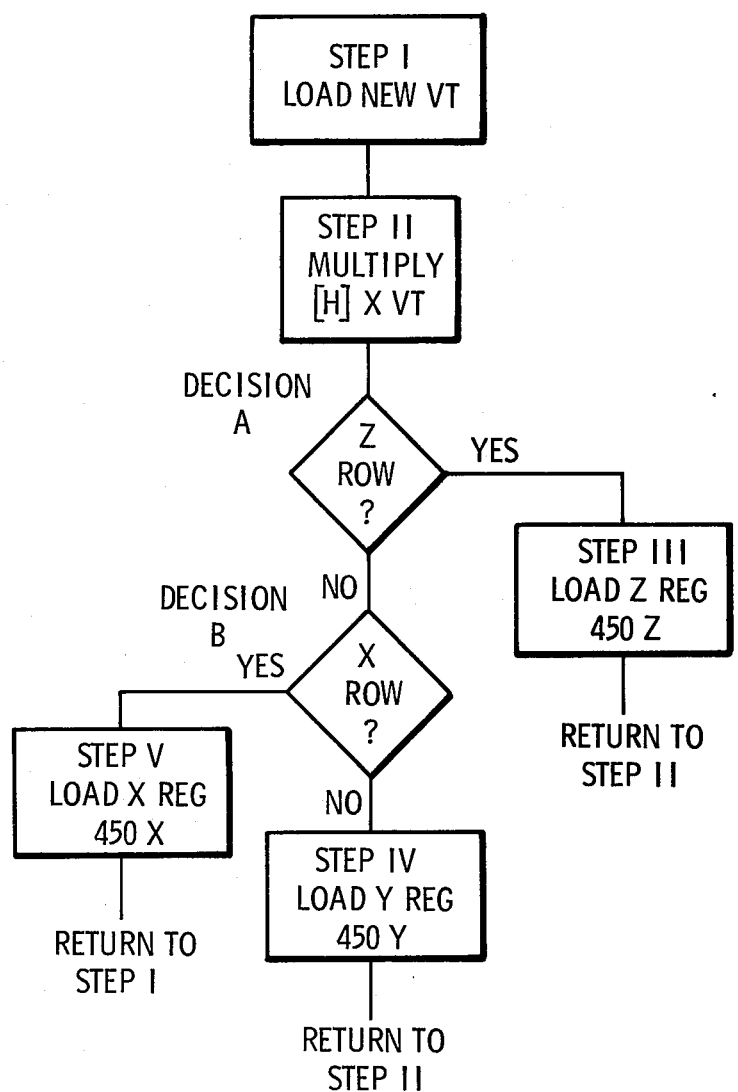
ROTATION CONTROL
Fig_8A

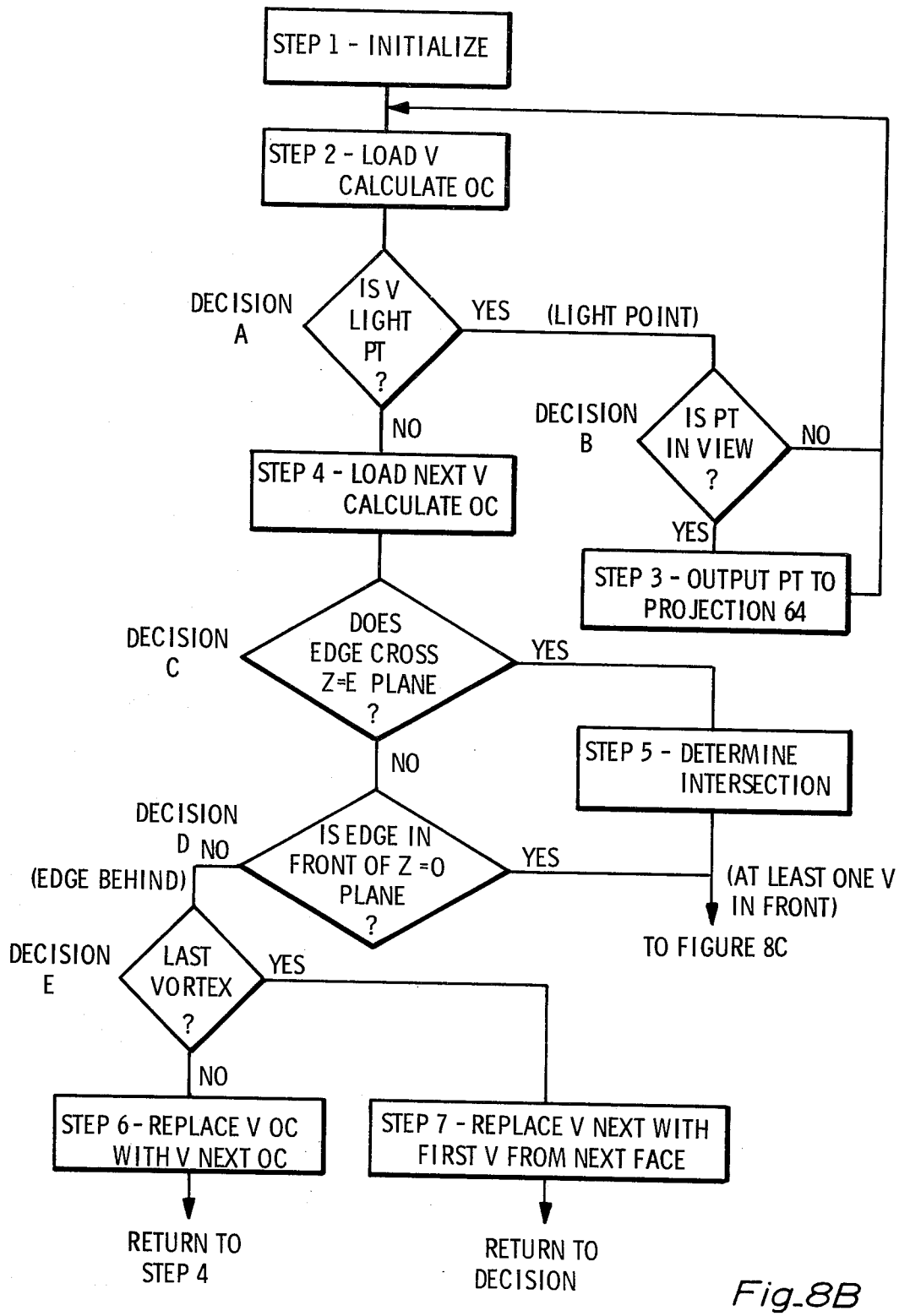
Fig_8B
CLIPPING CONTROL

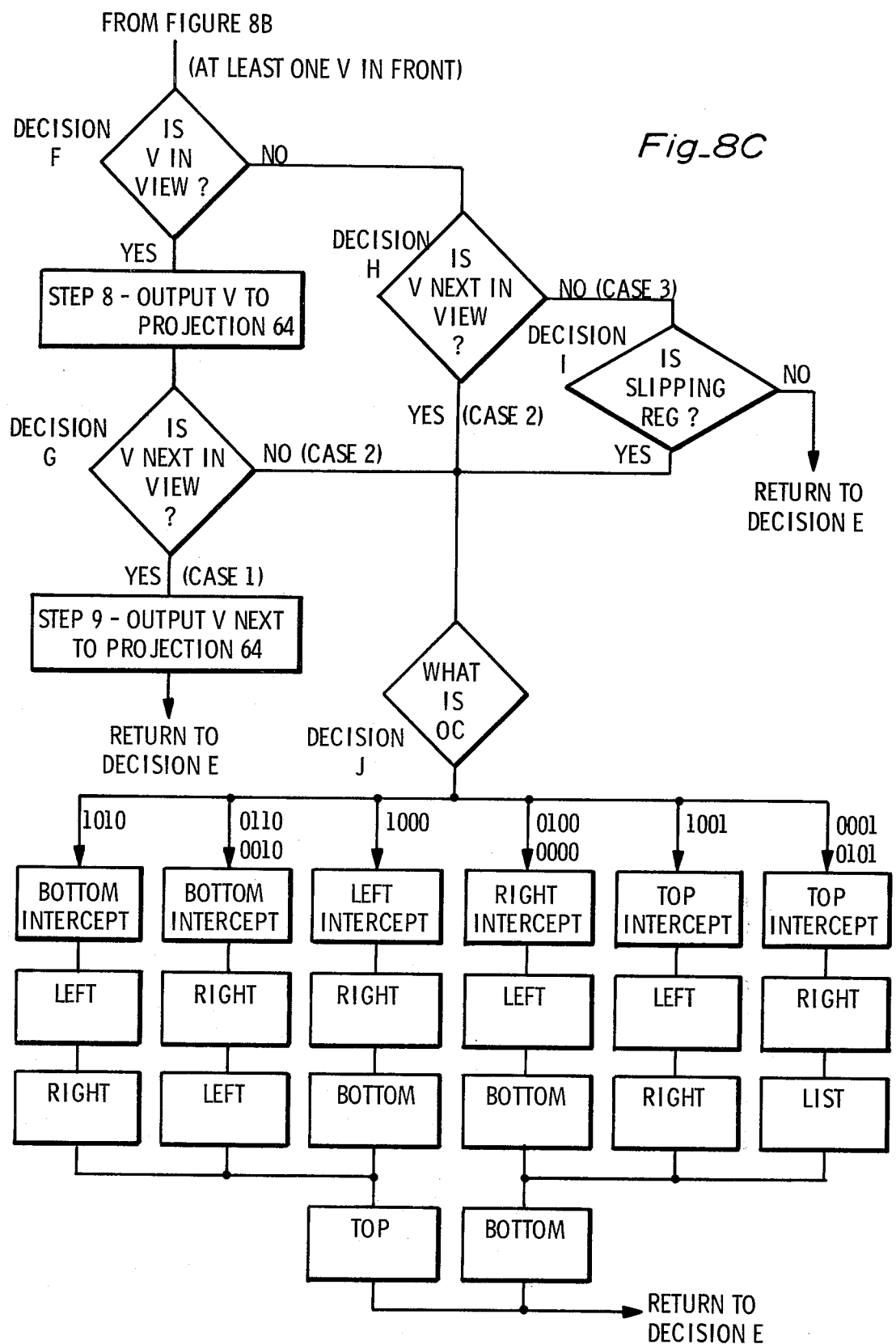
Fig_8C

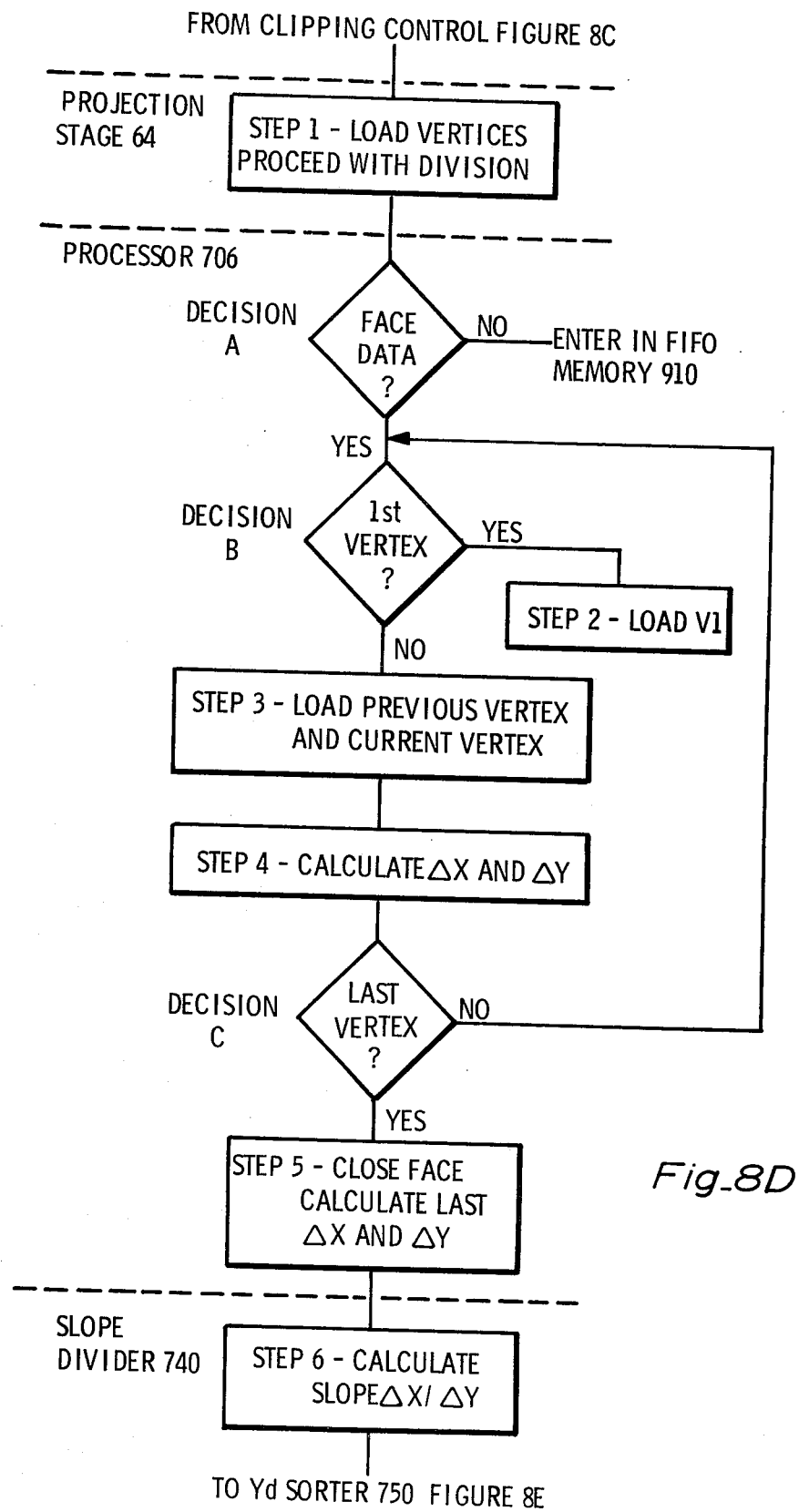
Fig_8D

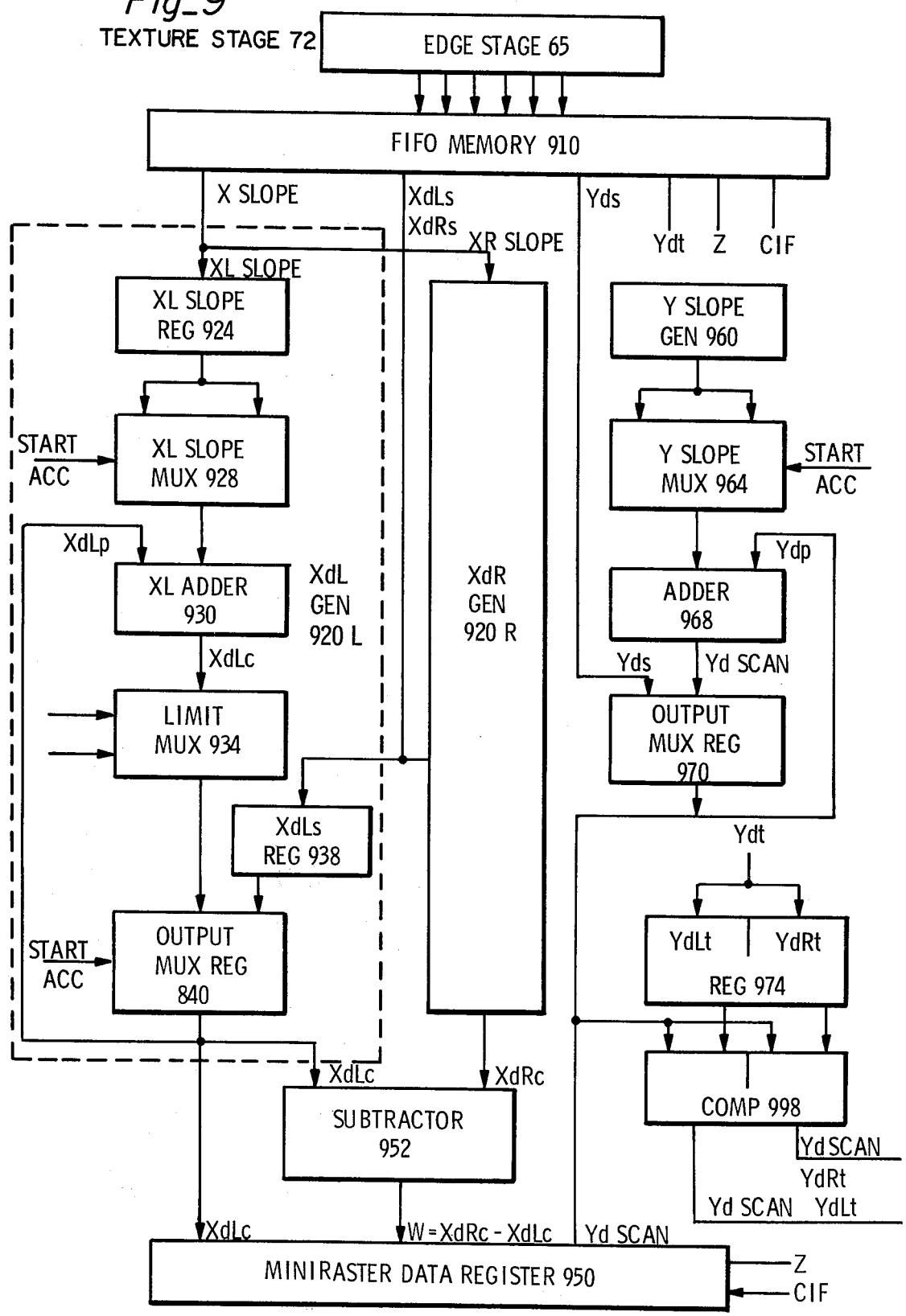

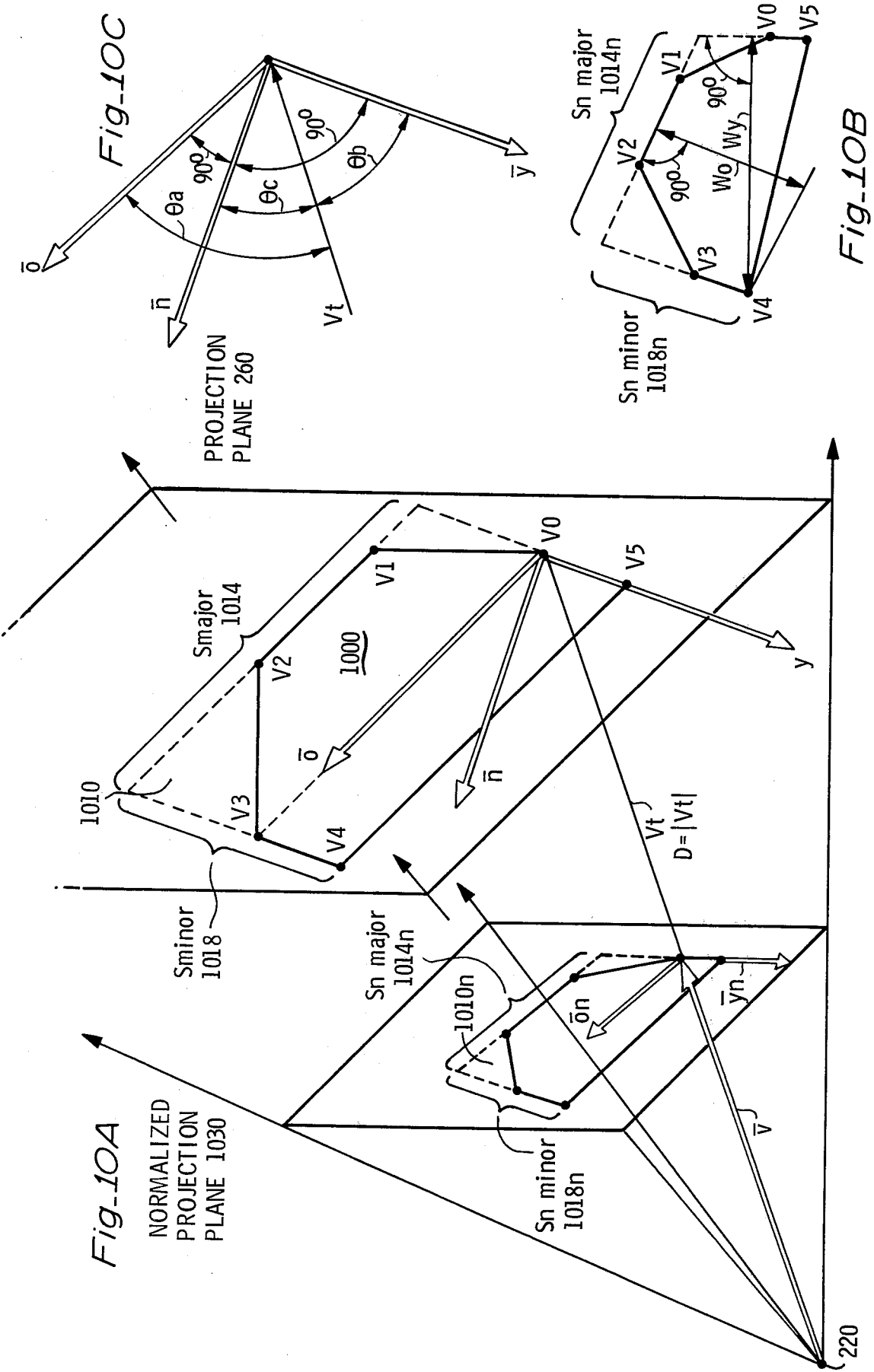

CLASS I

CLASS II

CLASS III

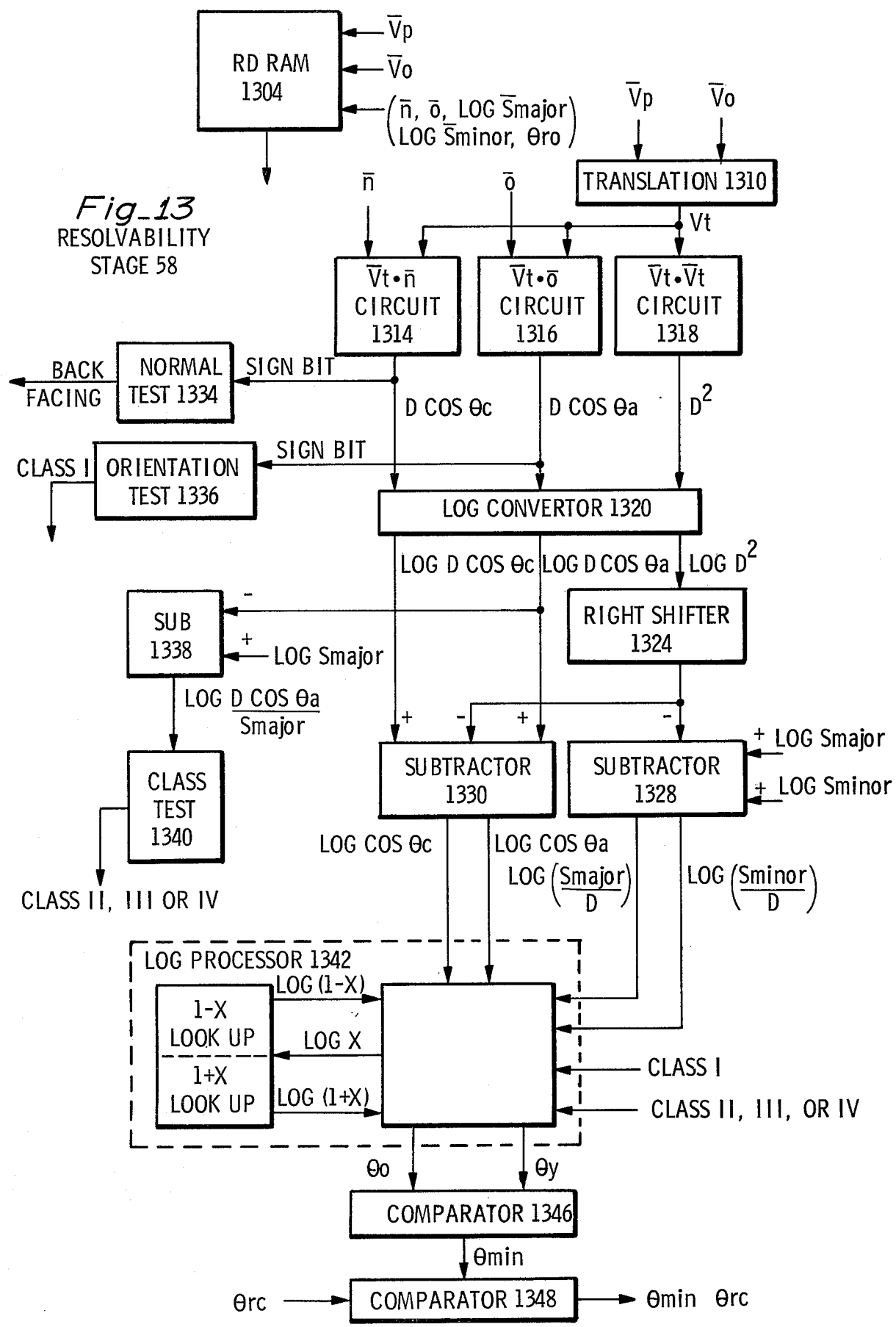

RESOLVABILITY TEST AND PROJECTION SIZE CLIPPING FOR POLYGON FACE DISPLAY

| TABLE OF CONTENTS | |
|---|---|
| SECTION | TITLE |
| I | ABSTRACT OF THE DISCLOSURE |
| II | BACKGROUND OF THE INVENTION |
| III | SUMMARY OF THE INVENTION |
| IV | DESCRIPTION OF THE FIGURES |
| V | GENERAL DESCRIPTION OF FLIGHT SIMULATION SYSTEM 10 |
| VI | DETAILED DESCRIPTION OF INTERFACE CONTROLLER 46 AND THE DATA FORMAT |
| VII | DETAILED DESCRIPTION OF DIGITAL VISUAL COMPUTER 12 IMAGE PROCESSOR 42 |
| VIII | TRANSLATION STAGE 60 |
| IX | ROTATION STAGE 62 |
| X | CLIPPING STAGE 63 |
| XI | PROJECTION STAGE 64 |
| XII | EDGE STAGE 65 |
| XIII | CONTROL LOGIC 70 |
| XIV | DISPLAY GENERATOR 44 |
| XV | RESOLVABILITY STAGE 58 |
| XVI | CONCLUSION CLAIMS |

SECTION II

BACKGROUND OF THE INVENTION

This invention relates to simulated perspective displays and more particularly relates to such displays employing digitally coded and stored information concerning faces of objects comprising an area to be viewed.

Digital image generators (DIGs) are computer based systems which utilize a large base of data representing coordinate information for points representing the vertices of polygons. These polygons are grouped to form objects which, in turn, are arranged to form an area in the world to be viewed.

For an understanding of the operation DIG's it is recommended that the following U.S. Pat. Nos. be studied: 4,077,062 entitled "Real-Time Simulation Of A Point System With A CRT Blank Period To Settle Beam Transients", which issued in Feb. 28, 1978 to R. G. Nielsen; 4,152,766 entitled "Variable Resolution For Real-Time Simulation Of A Polygon Face Object System", which issued May 1, 1979 to R. C. Osofsky et al.; 4,179,823 entitled "Real-time Simulation Of A Polygon Face Object System As Viewed By A Moving Observer", which issued Dec. 25, 1979 to J. B. Sullivan et al.; 4,179,824 entitled "Simulation Of An Object System Formed By Polygon Faces Having A Series Of Fundamental Shapes and Dimensions", which issued Dec. 25, 1979 to D. R. Marsh; 4,181,953 entitled "Face Vertex Correction For Real-time Simulation Of A Polygon Face Object System", which issued Jan. 1, 1980 to R. C. Osofsky; and 4,208,719 entitled "Edge Smoothing For Real-time Simulation Of A Polygon Face Object System As Viewed By A Moving Observer", which issued June 17, 1980, to R. W. Lotz, et al.

The aforementioned patents disclose DIG devices which access in real time the aforementioned vertex data and by means of a series of stages of translation, rotation, clipping and projection, which stages together comprise an "image processor", organize the vertex data accessed according to a current display scene. This scene is reconstructed many times per second to allow for a continuous series of such scenes to present a moving picture. The current display scene data is utilized to generate a video signal which drives a CRT viewed by, for example, a flight simulator operator, who is thus presented with a realistic dynamic scene based on the accessed data.

In a typical "flight" scene presented by such a DIG the number of visible faces in each current display scene varies as the simulated flight proceeds. During a complex or close range scene, the high number of visible faces may temporarily exceed the data handling capability of the image processor. This overload condition may be minimized by eliminating non-critical faces such as those faces currently having a display size below the visibility threshold or smaller than one scanline in height. It is believed that prior to this invention no means were available which functioned to eliminate such non-critical faces.

SECTION III

SUMMARY OF THE INVENTION

It is therefore an object of this invention to provide an image processor which eliminates small faces in the image display.

It is a further object of this invention to provide an image processor which is responsive to resolvability data for testing the display dimensions of each face object and eliminating faces having a projected size below the resolvable dimension threshold.

It is yet another object of this invention to provide an image processor which drops the data for faces having an angular subtense ($\theta$min) smaller than a predetermined angle.

SECTION IV

DESCRIPTION OF THE FIGURES

Further objects and advantages of the present invention, and the operation of the resolution clipping system, will become apparent from the following detailed description taken in conjunction with the accompanying drawings, in which:

FIGS. 2A and 2B, is a pictorial view of an aircraft and terrain features illustrating image vectors and O.C. regions;

FIG. 8, comprising FIGS. 8A, 8B, 8C, 8D, and 8E, is a logic diagram of processor control logic 70;

FIG. 9 is a block diagram of texture stage 72 which provides the starting points and widths of each scanline;

FIG. 10, comprising FIGS. 10A, 10B and 10C, is a perspective diagram showing an object face within the pyramid of vision projected onto the display plane;

FIG. 11, comprising

FIG. 13 is a block diagram of resolvability stage 58.

SECTION V

GENERAL DESCRIPTION OF FLIGHT SIMULATION SYSTEM 10

Figure 1:
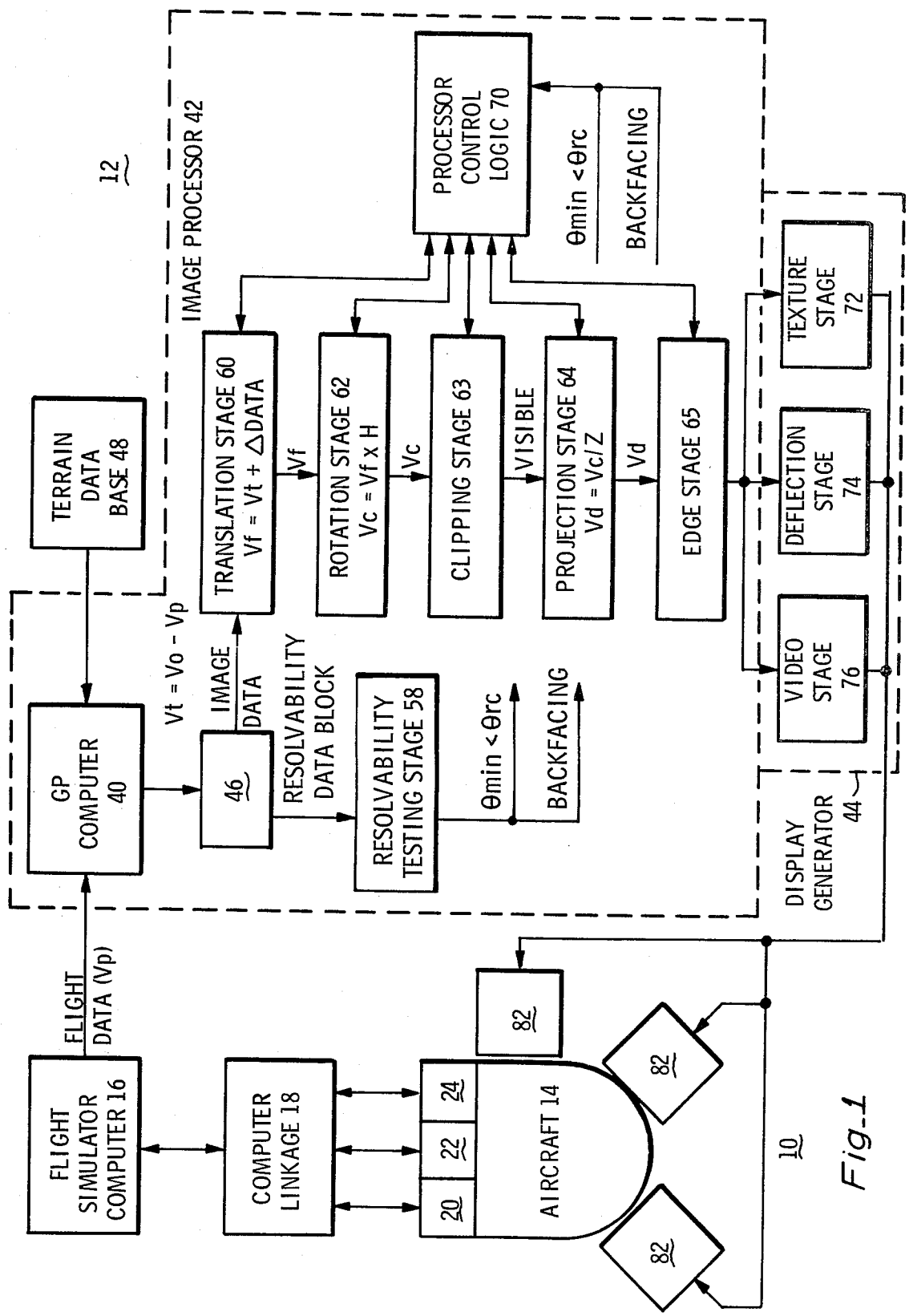
FIG. 1 is a block diagram of DIG visual system 10 and peripheral flight simulation equipment showing the data flow.

FIG. 1 shows flight simulation system 10 with visual capabilities provided by a digital visual system 12. A simulated aircraft 14 is linked to flight simulation computer 16 and visual system 12 through computer linkage 18. Flight computer 16 controls motion system 20 and instrument system 22 of aircraft 14 in response to the pilot's maneuvering action through aircraft control 24. Visual system 12 is formed by general purpose computer 40 (such as Digital Equipment Corporation PDP 11/25) plus image processor 42, display generator 44. Interface controller 46, within image processor 42, is provided to process flight data from aircraft 14 to translation stage 60, and to control image data flow from GP computer 40 via a data buffer.

GP computer 40 receives flight data, such as aircraft position Vp, aircraft roll, pitch, and yaw attitude (H matrix), etc., from computer 16. GP computer 40 additionally receives terrain dat- (both natural formations and cultural structures) from data base 48 such as runways, towers, hangers, roads, rivers, fields, moving objects, etc. In general visual system 12 may process and display terrain features consisting of points, lines, closed polygons, or combinations thereof. Preferably the aircraft position data is an aircraft position vector Vp extending from the simulated position of aircraft 14 to the origin of the terrain coordinate system (see FIG. 2). In order to simplify conception and data organization, the terrain origin is located proximate the touchdown area of the runway, and the x axis of the terrain coordinate system from data base 48 is coincident to the runway centerline. An updated Vp is supplied each frame period by flight simulation computer 16 as the flight parameters of aircraft 14 change. The earth data also includes the position of certain landmark points (Vo) such as the first vertex of each face, and the relative position of the remaining vertices and the points forming other terrain features (delta data). Translation stage 60 subtracts Vp from each Vo to form translated vectors (Vt=Vo−Vp). Resolvability testing stage 58 determines the minimum angular subtense ($\theta$min) of the dimensions of each face as viewed by the observer. Faces having a $\theta$min of less then the minimum resolvable angular subtense $\theta$rc, as defined by the resolvability code RC, are dropped from the flow of image data. Translation stage 60 then combines the delta with the appropriate Vt to provide the other face vertex vectors Vf for each face (Vf=Vt+delta data). Rotation stage 62 compensates each Vf for changes in aircraft 14 orientation (pitch, roll, and yaw) for each window (channel) and forwards Vc to clipping stage 63. Faces which are not visible to the pilot because they are outside his field of vision are eliminated from the data flow within image processor 42 by clipping stage 63. Projection stages 64 projects the three-dimensional Vc into two-dimensional display coordinates or vectors Vd. Edge stage 65 provides a list of visible edges defined by the end points and the slope. The data flow through image processor 42 and the mode of operation thereof is controlled by processor control logic 70.

Texture stage 72 within display generator 44 receives the visible edge list for coordination with the display raster. Deflection stage 74 provides the required analog deflection voltages to CRT display device 82. Video stage 76 receives the color, intrinsic intensity and size portion of the data for controlling the CRT beam voltage, current, and focus. The CRT in device 82 is preferably a beam penetration, random deflection tube which allows precise control of spot position, continuous control of spot focus and diameter, and provides at least two phosphors of different colors.

SECTION VI

DETAILED DESCRIPTION OF INTERFACE CONTROLLER 46 AND THE DATA FORMAT

GP computer 40 has an in-core, buffer memory which accumulates blocks of image data required to form each display frame. The in-core buffer contains initialization points (Vo) and delta data from data base 48 plus each new position vector Vp and rotational matrix (H) as they are computed by flight computer 16.

The image data accumulating in the in-core buffer is periodically transferred as a data block to hardware RAM buffer 304 in interface controller 46. Controller 46 processes the data words sequentially to image processor 42 while GP computer 40 simulaneously assembles the next data block in the in-core buffer for the next data handshake with RAM 304. The accumulation of data blocks in GP computer 16 and the handshake data transfer to RAM 304 is outlined in the following four operations:

Operation I—Preflight Load - Data Base 48 to Core Memory

Prior to each training flight, the content of data base 48 is loaded into computer 40 core-memory. Image data from data base 40 includes sixteen control words (0000–1111) having bit formats as described hereinafter, initialization data Vo, delta data, etc.

Operation II—Aircraft Orientation Update

The in-core memory is updated periodically with the most recent aircraft orientation angles roll, pitch and yaw (H matrix data) from flight computer 16. Preferably, this aircraft update occurs once each frame. The H matrix data is received by computer 40 as the sine and cosine of each of the three orientation angles—six items of data. The software of computer 40 responds to the orientation data to form the rotational matrix H described in the specification (Section IX). The software merely calculates the proper sine-cosine products to form a 3×3 matrix for each angle, and multiplies the three 3×3 matrices together to generate the nine elements of the rotational matrix H. These nine elements are generated each frame and inserted into RAM 304 at the proper place. The nine elements of rotational matrix H preferably occupy the lead position in the core-memory because the rotational perspective must be developed by rotation stage 62 each frame prior to displaying any of the object faces on display 82.

Operation III—Aircraft Position Update

The core-memory update also includes the most recent aircraft position vector Vp which latter forms a series of initialization vectors Vo in translation stage 60.

Operation IV—Handshake Between Core-Memory and RAM 304

As required the contents of the core-memory matrix are serially transferred to RAM 304 in interface controller 46, starting with the nine rotational elements.

The four above described operations involve simple software steps. Operations I, III, and IV are merely data transfer steps. Operation II involves forming a triple 3×3 matrix product, a mathematical operation which is well understood. Subroutines are available to execute this systematic multiplication.

FORMAT SUMMARY

The data format is formed by groups of data words which describe the nature and position of each object feature, and spaced instruction words for identifying the type of data in the immediately subsequent group of data words. The MSB bits of each instruction word are coded to define the particular instruction contained in the word, and the remaining bits concern the subsequent data. In the embodiment shown, a sixteen bit format is employed. The four MSB define the instruction and are decoded by processor control logic 70 to control the flow of data through image processor 42. The four LSB of each instruction word reveal the number of subsequent data words in the data word group to be processed under that instruction word. Each instruction word is loaded into registers 310A and 310B by control logic 70 in due course, and the immediately subsequent group of data words is loaded into RAM 350.

FIVE LOAD INSTRUCTIONS (0–4)

Each load instruction transfers point coordinates from buffer 306 into RAM 350 as follows:

```
         15   12 11    8 7 6    3     0
LDA (4) |0100|A A A A|R R|    |B B B B|
```

Load A instruction causes the subsequent group of B sets of X, Y, Z coordinates to be stored in RAM's 350X, 350Y, and 350Z, beginning at address A. The first coordinate (one of two sixteen bit words) is stored in the RAM 350X, the second in the RAM 350Y, and the third in the RAM 350Z. This sequence is repeated until B sets of coordinates have been loaded starting at address A. R specifies the significance of the bits in the subsequent sixteen bit data words for coordinating the distribution thereof across the 24 bits of RAM's 350.

Normal 24 bit resolution (R=3) requires two subsequent data words. The first word provides the sixteen LSB to RAM's 350 and the second word provides the 8MSB to RAM's 350. Vp and Vo data require the full 24 bits and therefore are preceded by an LDA instruction word with R=3. The LSB of Vp preferably corresponds to ⅜ of an inch to eliminate detectable jitter of the scene from frame to frame. A new Vp is calculated by FS computer 16 each frame, and the round-off error in the LSB of Vp causes the entire earth coordinate system to jump a ground distance equal to the LSB. This interframe displacement (motion resolution) is minimized and rendered indetectable to the pilot trainee by providing aircraft position vector (Vp) resolution at the ⅜ inch level. The LSB of Vo is preferably small in order to accurately position detailed structure within a terrain feature (positional resolution). In the embodiment shown, Vo LSB also equals ⅜ inch because image processor 42 is already required to handle the ⅜ inch bit in order to prevent interframe displacement. That is, the position resolution may have the same value as the motion resolution as in the embodiment shown; but it is not required that the two resolutions be equal. However, a ⅜ inch Vo position resolution permits moving objects such as other airplanes and ground vehicles to be viewed without interframe displacement. The MSB of both Vp and Vo is 262,144 feet forming a cubic gaming volume in data base 48 which is 262,144 feet on an edge.

Fine 16 bit resolution (R=1) requires a single subsequent 16 bit data word of delta data which is entered into the 16LSB of 24 bit RAM's 350 (bits 16–23 are loaded with the sign bit 15). The MSB corresponds to 1024 feet (when LSB=⅜ inch). The fine 16 bit resolution may be used to process the vertices of small terrain faces (largest dimension less than 1024 feet) which is associated with high resolution detailed structure.

Coarse 16 bit resolution (R=2) requires a single 16 bit subsequent data word of delta data which is entered into the 16 MSB of 24 bit RAM's 350 (bits 0–7 are loaded with "O"s). The MSB=262,144 feet and LSB=8 feet. The coarse 16 resolution may be used to process the vertices of large terrain faces in which the dimensions have been rounded off to multiples of eight feet. While the size resolution of these faces is eight feet, they are positioned with the same resolution as the associated Vo.

```
         15   12 11    8 7 6    3     0
LXY (3) |0011|A A A A|R R|    |B B B B|
```

Load XY instruction causes the subsequent group of B pairs of X and Y coordinates to be stored in the RAM 350X and RAM 350Y, beginning at address A. "O"s are stored in the corresponding addresses of the RAM 350Z. The data format is one or two 16 bit words of X data followed by one or two words of Y data. This sequence is repeated until B pairs of X-Y coordinates have been loaded into RAM's 350X and 350Y. The R codes are the same as for LDA.

```
LDX (0) |0000|A A A A|R R|    |B B B B|
```

Load X instruction causes the subsequent group of B X coordinates to be stored in the XT RAM 350X beginning at address A. Zeros are stored in the corresponding addresses of RAM's 350Y and 350Z.

```
LDY (1) |0001|A A A A|R R|    |B B B B|
```

Load Y instruction is the same as LDX except that the data is stored in RAM 350Y and "O"s are stored in the corresponding addresses in RAM 350X and RAM 350Z.

```
LDZ (2) |0010|A A A A|R R|    |B B B B|
```

Load Z instruction is the same as LDX except that the data is stored in the RAM 350Z and "O"s are stored in corresponding addresses of RAM's 350X and 350Y.

FIVE RECALL INSTRUCTIONS (5-9)

Recall instructions load the first vertex Vo of each face into RAM's 350 and initiates generation of the associated face.

```
         15      11    8 7 6   4 3    0
RCA (9) |1 0 0 1|A A A A|R|S S S|B B B B|
```

Recall A instruction causes the single subsequent set of coordinates for the first vertex of a face, which typically is also an initialization vector Vo, to be loaded into the first location of RAM 350X, RAM 350Y, and 350Z. The other vertices of the current face have already been entered into RAM's 350 in CCW order as 16 bit coarse or fine data under one of the load instructions (0-4). These other vertices are now recalled in CCW order from RAM's 350 beginning with address A of RCA. Normal 24 bit resolution (R=3) and coarse 16 bit resolution (R=2) have been previously described. S is a scale factor. When S=7, the current face is displayed full size. As S decreases the size of the current face is reduced by factors of 2.

```
RXY (8) |1 0 0 0|A A A A|R|S S S|B B B B|
```

Recall XY instruction causes the single subsequent set of first vertex Vo coordinates to be loaded into the first address of RAM 350X and then the first address of RAM 310Y. Ram 350Z is unaffected. The face generation then proceeds as described under RCA.

```
RCX (5) |0 1 0 1|A A A A|R|S S S|B B B B|
```

Recall X instruction causes the single subsequent X coordinate of the first vertex Vo to be loaded into the first address of RAM 350X. RAM's 350Y and 350Z are unaffected.

```
RCY (6) |0 1 1 0|A A A A|R|S S S|B B B B|
```

Recall Y instruction causes the single subsequent Y coordinate of the first vertex Vo to be loaded into the first address of RAM 350Y; RAM's 350X and 350Y are unaffected.

```
RCZ (7) |0 1 1 1|A A A A|R|S S S|B B B B|
```

Recall Z instruction causes the single subsequent Z coordinate of the first vertex Vo to be loaded into the first address of RAM 310Z; RAM's 350X and 350Y are unaffected.

```
         15                           0
RCL (10)|1 0 1 0|A A A A|R|S S S|B B B B|
```

Recall Load instruction does not load any new data into RAM's 350 but is the same as RCX in other respects. RCL is used to hold the previous Vo in order to construct another face contiguous with or proximate to the previous face using the previous Vo as the first vertice or a landmark point for establishing the position of the vertices of the contiguous face.

OTHER INSTRUCTIONS

```
         15  12 11       10 9 8   4 3    0
CIF (11)|1 0 1 1|SEL AXIS|S±|I I I I|B B B B|
```

Color Intensity Flag instruction is followed by B additional words, i.e.,

```
          15    8 7       6  5 4  3 2   1   0
CIF1 (B = 1)|Spares|OBJ CODE|FB|IOS|VER RES|
```

```
            15       10 9     4  3 2   1 0
CIF2 (B = 2)|Color-|Color +|Col Sel|Spares|
``` which define the visual characteristics of each data base feature (face, line, or point). The visual characteristic of certain cultural objects such as signal beacons and runway lamps are a function of viewing direction and require directional data. SEL AXIS identifies the viewing axis to which the CIF data pertains;

SEL AXIS=00: the color and intensity of the object is uniform in all directions—ordinary object.

SEL AXIS=01: the color of the object depends on the direction of viewing along the X axis—bidirectional object.

SEL AXIS=10: bidirectional along Y axis.

SEL AXIS=11: birdirectional along Z axis.

S±(SIGN±) identifies the direction of view of the object along the axis identified by SEL AXIS. COLOR+ identifies the color of the object when viewed from the S+ direction, and COLOR− identifies the color of the object when viewed from the S− direction. COL SEL permits ordinary non-direction features to be displayed in a color from COLOR+(COL SEL=0) or from COLOR−(COL SEL=1). I (INTENSITY) determines the intensity of the data base feature. When only an intensity change is required to display the current object, only CIFO (B=0) is employed. OBJ CODE identifies the type of object to be recalled:

OBJ CODE = 000: 3 dimensional face (a face having a vertical component). Most 3D faces form part of a 3 dimensional object such as the side or top of a building.
= 001: Spare.
= 010: Spare.
= 011: Face to line, such as runway stripes which narrow down to a line with distance.
= 100: Sky.
= 101: Line.
= 110: Light point.
= 111: 2 dimensional face, a completely horizontal face in the X-Y plane.

Figure 2:
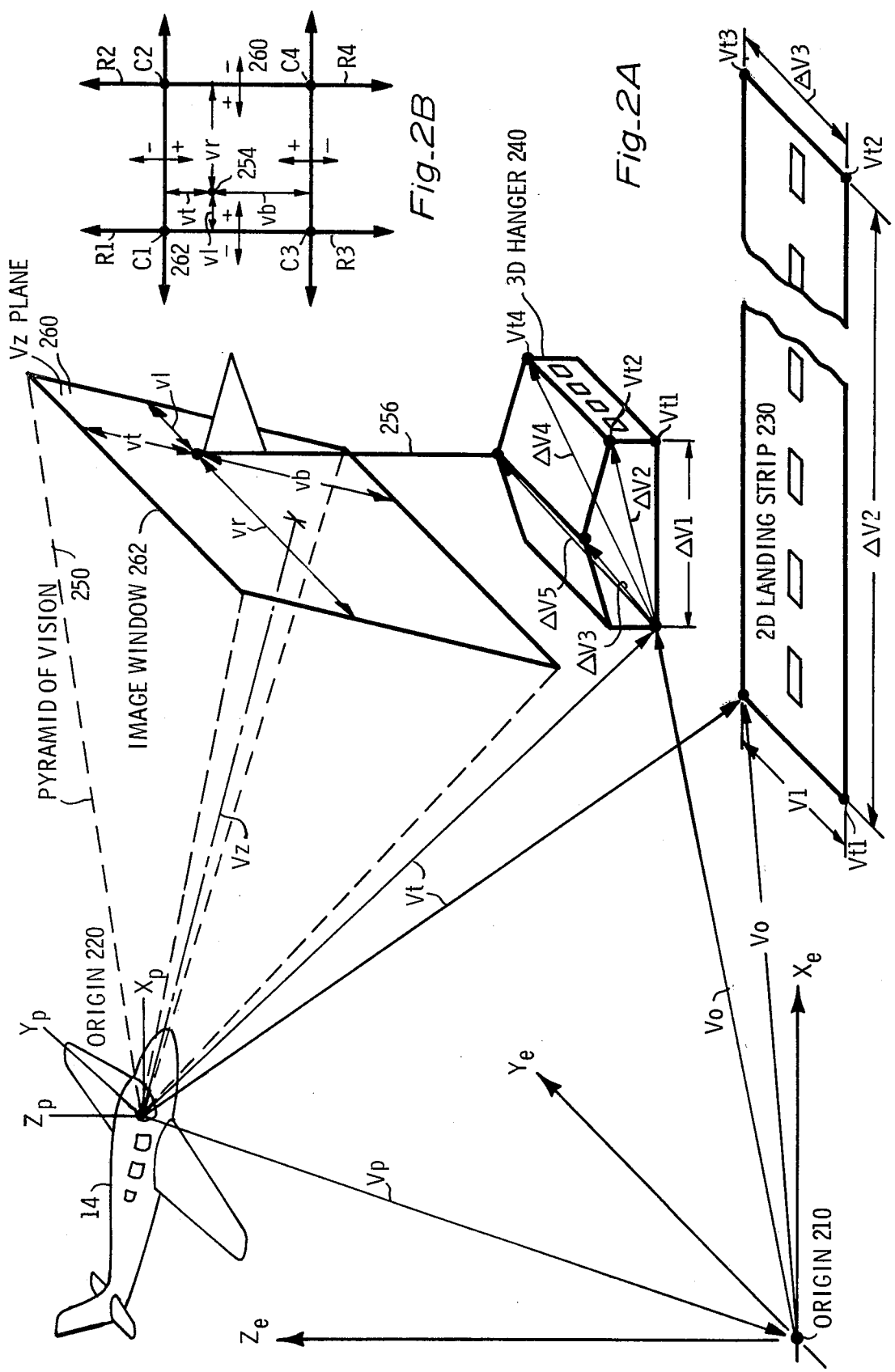
FIG. 2, comprising

The use of Recall instruction as illustrated in FIG. 2a is different for two dimensional faces on the X-Y ground plane (which always face the observer) and faces of a 3 dimensional object (which are sometimes occluded), as illustrated in FIG. 2. Two dimensional faces are identified by a 2D face object code in the previously loaded CIFI data. RCX computes the vertices of each face by starting with the X, Y, Z coordinates of Vo stored in the first address of RAM's 350 and combining additional vector coordinates from RAM's 350 starting at address A. B is the number of vertices in the face, and, since Vo is the first vertex, B-1 additional vectors (Delta V1, Delta V2, ... Delta VB-1) are required to generate the other vertices. The vertices are always stored and retrieved in counter-clockwise order. Three dimensional faces are identified by a 3D object code. Vo is not used as a vertex for 3D faces, so that B additional vectors (Delta V1, Delta V2, ... Delta VB) are required to display a face having B vertices. The RAM addresses containing the additional vector coordinates for 3D faces are provided by one or two data words 3DV1 and 3DV2 following the X data word or words. Each additional vector in 3D recall describes the position of a vertex with respect to Vo as opposed to a 2D recall, in which each additional vector describes the position of a vertex with respect to the previous vertex. The address format for additional 3D vectors in RAM 350 is

```
       15   VR    VR    VR   VR 0
V1    |DDDD|CCCC|BBBB|AAAA|  first word

15   VR    VR    VR   VR 0
V2    |HHHH|GGGG|FFFF|EEEE|  second word
```

If the face has four or fewer vertices, only the first word is used. The order in which the RAM 350 addresses are used is reverse alphabetical. For example, when recalling a face having five vertices, the first vertex will be computed using the vector stored at E. The last vertex is always stored at A. Scale factor is the same for a 3D face as for a 2D face.

FB identifies data fed back for CRT correction to eliminate ballistic nonlinearities and provide a true display.

IOS identifies data displayed on the instructor's monitor 28 only.

VER RES determines the scan line density (vertical display resolution in horizontal lines per vertical scan).

| | |
|---|---|
| VER RES = 000: | 128 lines low resolution for rapidly painting structureless large areas such as the sky with a defocused electron beam. |
| = 001: | 256 |
| = 010: | 384 |
| = 011: | 512 |
| = 100: | 640 |
| = 101: | 768 |
| = 110: | 896 |
| = 111: | 1024 lines high resolution for painting detailed objects. |

```
           15  12 11   8 7              0
LCD (15)  |1111|      |CCCCCCCC|
```

Load Correct Data instruction enters C vertices with corrected CRT coordinates.

```
           15
STG (12)  |1100|AAAA|CCCCCCCC|
```

Control String instruction causes the display of string of C equally spaced lights or four-sided two dimensional faces, depending on the CIF1 OBJ CODE. The first light of a string is displayed at the Vo+A position and a spacing vector stored at A+1 is used to fix the position of the second light and all successive lights until C lights have been displayed. The first vertex of the first face of a string of faces is displayed at the Vo+A position and the other three vertices are found successively adding the vectors stored at RAM's 350 addresses A+1, A+2, and A+3. The vector stored at A+4 locates the first vertex of the next face with respect to the last vertex of the current face.

```
           15  12       8 76 5  4 3      0
LDH (13)  |1101|AAAA|0|CC|BBBB|
```

Control Load H instruction loads the H rotation matrix on data bus 307 into RAM 410H in rotation stage 62. The elements of the rotation matrix are in 16 bit 2's complement form, and each address of RAM 410H will store three elements. The rotation matrix multiplies the translated X, Y, and Z coordinates in the following form:

$$\begin{bmatrix} h11 & h12 & h13 \\ h21 & h22 & h23 \\ h31 & h32 & h33 \end{bmatrix} \begin{bmatrix} XT \\ YT \\ ZT \end{bmatrix} \begin{bmatrix} XR \\ YR \\ ZR \end{bmatrix} \begin{matrix} = h11\ XT + h12\ 1/T + h13\ ZT \\ = h21\ XT + h22\ YT + h23\ ZT \\ = h31\ XT + h32\ YT + h33\ ZT \end{matrix}$$

The element data follows the LDH instruction in the following order:

h31, h32, h33, h21, h22, h23, h11, h12, h13. The matrix is always stored in the first three addresses of RAM 410H, so A=0, the initial address and B=3, the number of matrix rows. C is the channel number associated with rotation matrix.

```
           15  12 11    8 7 6 3        0
LRD (14)  |1101|AAAA|1|  |BBBB|
```

Control Load RD loads a block of B items of resolvability data for the current face on data bus 307, into resolvability data (RD) RAM 1304 in resolvability stage 58, starting at address A=3. In the embodiment of FIG. 13, the block of resolvability data includes:

B=0, n̄: a unit vector normal to the face of the current Vt.

B=1, Ō: a unit vector along the major dimension of the face of the current Vt.

B=2, Log S̄ major: a vector along the major dimension of the current Vt.

B=3, Log S̄ minor: a vector along the minor dimension of the face of the current Vt.

B=4, θrc (optional): the minimum resolvable angular subtense for the current face or object. The resolvability standard θrc may vary with each face as in the above RD block, or θrc may be fixed and entered as initial data from data base 48. The current Vp and Vo are loaded into RD RAM 1304 at A=0 and A=1 simultaneously with RAM 350. The details of determining the resolvability of each current face is disclosed in connection with resolvability stage 58 (Section XV, FIG. 13).

SECTION VII

DETAILED DESCRIPTION OF DIGITAL VISUAL COMPUTER 12

Each stage of digital visual system 12 is shown in detail in FIGS. 3 through 9. Preferred embodiments are disclosured at the detailed logic level. Each component is described by function, input-output characters, or conventional nomenclature to enable one skilled in the arts of simulation, digital design, and computer programming to practice the invention. The components are additionally designated by the manufacture's IC type number from the following integrated circuits data books:

Texas Instruments Incorporated
"The TTL Data Book of Design Engineers"
First Edition, Copyright 1973
National Semiconductor Corporation
"Digital Integrated Circuits"
January 1974
Advanced Micro Devices Inc.
"Advanced Micro Devices Data Book"
Copyright 1974 unless otherwise specified. Further, many inverters are employed throughout CDIG system 10 for buffering signals with multiple loads. These buffer inverters are type 74S04 unless otherwise stated.

SECTION VIII

TRANSLATION STAGE 60

GENERAL OPERATION

Figure 3:
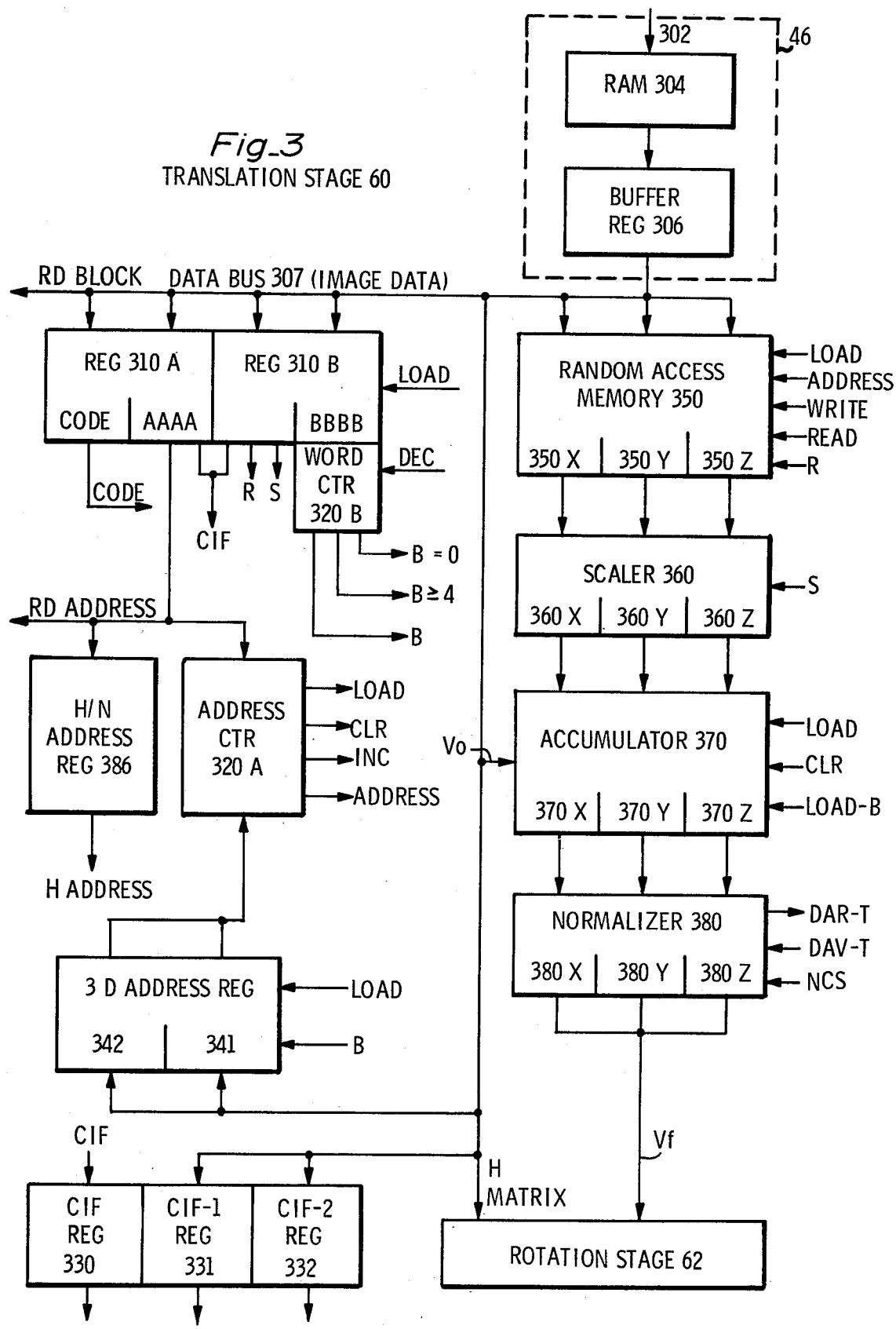
FIG. 3 is a block diagram of translation stage 60 wherein the delta data is translated into face vertex vectors Vf.

FIG. 3 shows translation stage 60 of image processor 42 and a portion of controller 46. Controller 46 receives image data in sequential order from computer 40 at input 302 of random access memory 304. The image data is arranged in data blocks M bits wide and N words long, which in the embodiment shown is 16×1024. RAM 304 periodically handshakes with a core memory in GP computer 40 to reproduce each block of data. Image data is sequentially transferred from RAM 304 through a buffer register 306 to image data bus 307 in response to load pulses from interface controller 46.

Each instruction word on bus 307 is loaded into instruction registers 310 A and B which forwards the code bits (four MSB's) to control logic 70. Control logic 70 then selectively activates the remaining blocks of translation stage 60 for processing the subsequent B words of data appropriately. Load instructions (0–4) cause control logic 70 to send WRITE to RAM's 350, which then writes the subsequent B data words starting at ADDRESS A. Counter 320A increments ADDRESS A while counter 320B decrements down from B. When the B count expires, B=0 is forwarded to logic 70 and the next instruction is loaded into instruction registers 310.

Vp is loaded into RAM's 350 by a Load A instruction (R=3) immediately after each handshake, and Vp is always positioned at the same address (address 1). Next, B words of delta data vectors is entered by another load instruction.

Recall instructions (5–9) load the Vo associated with the previously loaded B words of delta data. Each Vo is positioned at the same address in RAM 350 (address 0). The recall instruction causes control logic 70 to foward READ to RAM's 350, and the B words of delta delta are recalled from RAM's 350 and processed through the remainder of translation stage 60.

CIF instruction causes control logic 70 to forward LOAD to CIF register 330 to receive SEL AXIS, SIGN±, and Intensity data from instruction registers 310. B subsequent data words are entered into CIF-1 register 331 and CIF-2 register 332 where the CIF data is temporarily held. The CIF data is advanced into corresponding CIF registers 460 in rotation stage 62 as Vf data enters rotation stage 62 from normalization register 380.

Three dimensional vertex registers 341 and 342 receive the addresses of vertices of 3D faces in RAM 350. The addresses in registers 341 and 342 address RAM's 350 via address counter 320A.

RAM's 350 write image data from interface controller 46 after load instructions and read image data after recall instructions. RAM's 350 temporarily store Vp and delta V's until the associated Vo is entered permitting the faces to be generated.

Scalers 360 (X, Y, and Z) control the size of the displayed image by expanding or contracting the X, Y, and Z position coordinates by factors of two. S data from register 310B shifts the binary decimal point to effect the scaling.

Accumulators 370 receive the X, Y, and Z position coordinates and perform the following translation computations (illustrated in FIG. 2):

basic translation: from the origin 210 of data base coordinate system to the origin 220 of aircraft 14 coordinate system
$Vp + Vo = Vt$ 2D translation: from initial vertex to the remaining vertices sequentually—cumulative (landing strip 230)
$Vt + Delta\ V1 = Vt1$
$Vt1 + Delta\ V2 = Vt2$
$Vtn + Delta\ (Vn+1) = V(tn+1)$ 3D translation: from initial vertex to each remaining vertex separately—non cumulative (hanger 240)
$Vt + Delta\ V1 = Vt1$
$Vt + Delta\ Vn = Vtn$ Normalization registers 380 (X, Y, and Z) loads the translated vertices Vt, and left shifts leading zeros (or ones for negative Vt's) in response to control logic 70. The first difference between the MSB and the second MSB in any of the normalization registers 380 generates a normalization complete signal, (NCS), back to control logic 70. Normalization complete in any of the normalization registers 380 stops the normalization process of all the registers insuring that the normalized points maintain consistent dimension units and remain on the same line of vision as viewed on display 82. Normalization has the advantage of reducing the 24 bit input image data into bits of normalized image data by eliminating either leading zeros (or ones for negative numbers). The data load is reduced to 66% with negligible loss in position resolution.

DETAILED DESCRIPTION

RAM 304 may be formed by a 16 bit×24 word RAM (sixteen 93415's, Fairchild) for holding the block of image data from GP computer 40.

Buffer register 306 may be formed by a 16 bit register (four 74S175's) followed by buffer inverters as required (74S04).

Register 310A may be an eight bit register (two 74S175's) for receiving four bits of code (4MSB) and four bits of RAM address (4LSB).

Register 310B and word counter 320B may be formed together by an eight bit down counter (two 74S163) for receiving the compliment of B and counting to 15. At B compliment=15, B=0 appears on the carry out terminal.

Address counter 320A may be a 2:1 inverting multiplexer (74S158) followed by a four bit up counter (one 74S163). During load and recall instructions, counter 320A increments the start address AAAA to RAM's 350. While processing three dimensional faces counter 320A processes the face vertex addresses in three D registers 341 and 342.

CIF register 330 may be and eight bit register (two 74S175) for receiving eight bits of SEL AXIS, S± and Intensity Data from the CIF Load instruction.

CIF-1 and CIF-2 registers 331 and 332 may be 16 bit registers (four 74S174) for receiving two 16 bit words of CIF data immediately following the CIF instruction.

Three dimensional registers 341 and 342 may be eight 4 bit tristate registers (eight 8551) preceded by a 3 line to 8 line decoder (one half 74S139) which enables one of the eight tristate registers in response to the three LSB's of B from word counter 320B.

RAM 350X may be a 24 bit RAM (six 74S189's) to accommodate the 24 bits of X coordinate image data. The 24 bit RAM is preceded by a 2:1 8 bit multiplexer (two 74S158) between a pair of true compliment zero one elements (two 74H87's each). During 16 bit fine resolution (R=1) the right hand zero one element forwards the 8LSB's of the image data to the 24 bit RAM, and the righthand zero one element enters all zeros (or all ones depending on the sign of the image data). During 16 bit coarse resolution (R=2) the right hand zero one element enters all zeros and the lefthand zero one element forwards the 8 MSB's.

Scaler 360x may be formed by a flow through right shifter device (twelve 25S10's AMD) in response to S data from register 310B counter.

Accumulator 370x may be a 24 bit adder (six 74283's) for receiving data at the A input, followed by a 24 bit return register (six 74S175's) which outputs to the B input. Vp is processed through the adder and return register, and returned to the B input. Vo is loaded at the A input and added to Vp to form Vt and returned to the B input. Delta data is then loaded at the A input and added to Vt to form the remaining vertice vectors Vf1-Vfn, which are advanced through the return register to a 24 bit buffer register (four 74S174's) where the Vf's are held until normalizer 380x is free.

Normalizer 380x may be formed by a 24 bit shift register (three 74199) plus a Buffer register (four 74S174's) which holds the normalized Vf's until rotation stage 62 is free to handle the next Vf.

SECTION IX

ROTATION STAGE 62

GENERAL-H MATRIX

Figure 4:
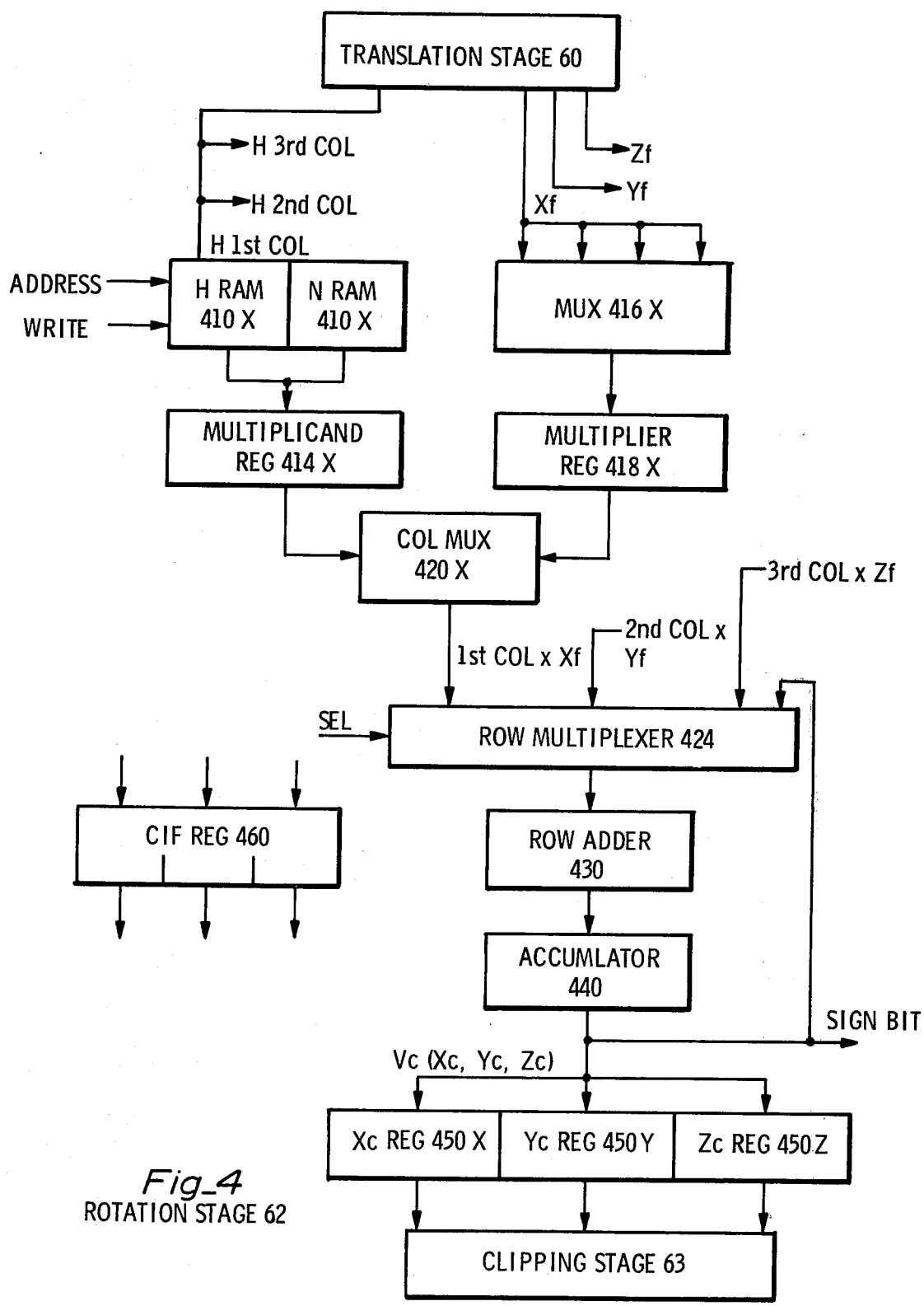
FIG. 4 is a block diagram of rotation stage 62 wherein each Vf is multiplied by H matrix.

FIG. 4 shows rotation stage 62 of image processor 42 which multiplies the translated point vectors Vf1-Vfn from translation stage 60 by the rotation matrix H provided on data bus 307 to produce a rotated or channel vectors Vc (XcYcZc):

$$\begin{matrix} Xc \\ Yc \\ Zc \end{matrix} = [H] \begin{matrix} Xf \\ Yf \\ Zf \end{matrix}$$

Each channel corresponds to the perspective view from one window of aircraft 14.

The rotation matrix H is developed from yaw (Y, left), pitch (P, down), and roll (R, right) motions by flight simulator 16 using conventional software. The order of rotation is Y followed by P, and the matrices for the separate rotations from translated to rotated pilot eye or channel coordinates are as follows:

$$HY = \begin{bmatrix} \cos Y & \sin Y & 0 \\ -\sin Y & \cos Y & 0 \\ 0 & 0 & 1 \end{bmatrix}$$

$$HP = \begin{bmatrix} \cos P & 0 & -\sin P \\ 0 & 1 & 0 \\ \sin P & 0 & \cos P \end{bmatrix}$$

$$HR = \begin{bmatrix} 1 & 0 & 0 \\ 0 & \cos R & \sin R \\ 0 & -\sin R & \cos R \end{bmatrix}$$

The composite matrix H describing this rotation is given by the matrix product:

[H]=[HR] [HP] [HY]=3 columns×3 rows matrix

The aircraft attitude matrix H is constant for each frame and is therefore computed only once per frame for each channel.

The three elements of the first column of the H matrix are entered into H RAM 410x by WRITE from control logic 70 immediately subsequent to the Load H instruction. The first column is then multiplied by the Xf coordinate of each of the translated vector series Vf1-Vfn in turn within column multiplier 420X. The three elements of the second and third columns of [H] are similarly entered into H RAM 410Y and 410Z (not shown). The nine products generated above are combined into Xc, Yc, and Zc by row multiplexer 424 and adder 430. The resulting Vc is forwarded to clipping stage 63.

DETAILED DESCRIPTION

H RAM 410x may be a 16 word by 16 bit sequential access memory (four 74S189's) for holding the three words in the first column of the 3×3 H matrix and providing 13 spare 16 bit addresses. WRITE and ADDRESS are provided by control logic 70.

Multiplicand register 414x may be a 16 bit buffer register (four 74S175's) for holding the current output of H RAM's 410x available to multiplexer 420x while the next address in RAM's 410x are accessed.

MUX 416x may be a 16 bit dual 4-1 multiplexer (three 74S153's) for providing four bits of output plus carry over bit.

Multiplier register 418x may be a 5 bit buffer register (one 74S174) for holding the output of MUX 416x available to multiplier 420x.

Column multiplier 420x may be formed by eight AM 25S05's (Advanced Micro Devices in 16 bit×4 bit configuration) followed by a buffer product register (three 74S175's) and operates as described in connection with Multiplier 330 in U.S. Pat. No. 3,996,672 which issued Dec. 14, 1976.

Row Multiplexer 424 may be a 20 bit 4 to 1 multiplexer (ten 74157's connected in parallel) which sequentially select the first row elements of each column for summing in row adder 430 to form Xc. The second and third row elements are likewise summed to provide Yc and Zc.

Row adder 430 may be a 20 bit adder (five 74783's) for summing the row products of the H matrix.

Accumulator 440 (three 74174's) returns intermediate sums to multiplexer 440 which are required in forming Vc.

Buffer registers 450 may be 18 bit registers (four 74175's) for holding Vc (Vx, Vy, Vz) prior to clipping.

CIF register 460 may be a 40 bit register for holding the CIF data from CIF registers 330, 331, and 332.

SECTION X

CLIPPING STAGE 63

GENERAL

Figure 5:
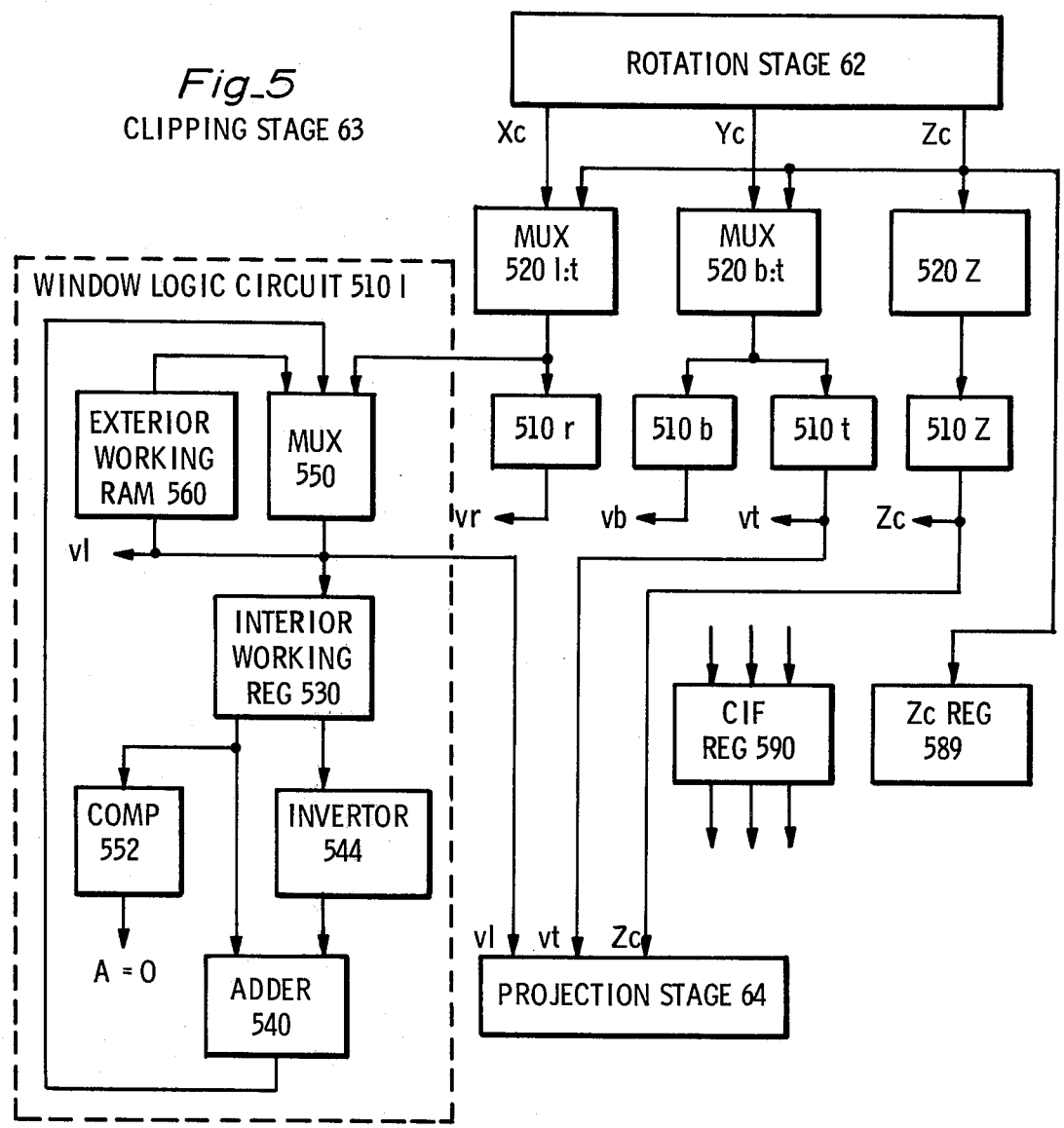
FIG. 5 is a block diagram of clipping stage 63 which eliminates image data outside the field of vision.

FIG. 5 shows clipping stage 63 which eliminates points outside the viewing volume or pyramid of vision 250 shown in FIG. 2a. Pyramid of vision 250 has its vertex at the eye of the pilot (origin 220). The viewing volume in the embodiment shown is four sided, bounded by four planes defined by the four sides of the aircraft window.

Clipping is accomplished at the object face level. Vertices defining each face edge are processed in sequence through clipping stage 63 to determine whether the face is:

Case A—face completely within view,
Case B—face partially within view, or
Case C—face completely out of view.

Faces which are only partially in view (Case B) are intercepted by the sides of pyramid of vision 250. In the process of clipping, Case B faces are modified by the addition of new edges. The result is a modified closed polygon face that is completely within pyramid 250.

The position of any point or vertex relative to pyramid of vision 250 is defined by the distance of that vertex from each of the four sides of pyramid of vision 250. Referring to FIG. 2a point 254 forming the top of the flag pole 256 is positionally defined by the four window coordinates vl, vr, vb, vt in Zc plane 260. These window coordinates are calculated as follows:

$$vl = Kl\ Z + X$$
$$vr = Kr\ Z - X$$
$$vb = Kb\ Z + Y$$
$$vt = Kt\ Z - Y$$

where the K's are constants associated with the vertex angles of pyramid 250. For a square pyramid of vision having equal vertex angles A, $Kl = Kr = Kb = Kt = \text{Tan}(A/2)$. A point is inside the truncated pyramid of vision 250 if $vl \geq 0$, $vr \geq 0$, $vb \geq 0$, $vt \geq 0$, and $Zc > 0$.

The above window coordinates are calculated from Vc by window logic circuits 510-1, 510-r, 510-b, 510-t, and 510-z shown in FIG. 5 (only 510-1 is shown in detail). Window circuit 510-1 receives Xc and Zc from 1:r multiplexer 520 for temporary storage in interior working registers 530. Adder 540 and inverter 544 cooperate to perform the required addition. Window coordinates vl and vt are forwarded to projection stage 64 to become display coordinates Xd and Yd, and Zc is forwarded for range attenuation effects.

The signs of the window coordinates are combined in a single five-bit out-code (OC):

OC = sign 1, sign r, sign b, sign t (and sign Z) where the sign of each window coordinates is "0" for positive and "1" for negative. The origin of each window coordinate is the corresponding boundary of image window 262 with the negative direction extending away from image window 262 (see FIG. 2b, left for vl, right for vr, up for vb, and down for vt). The positive direction for each window coordinate is toward the center of image window 262. The four boundaries of pyramid 250 subdivide the positive half-space in front of aircraft 14 into nine regions. The out-code of each Vf identifies the region in which the point or vertex is located. The out-code for each region of the two-dimensional projection of pyramid 250 is shown in the following table:

| upper left region | upper region | upper right |
|---|---|---|
| 1001 (0) | 0001 (0) | 0101 (0) |
| left region | visible region window 262 | right region |
| 1000 (0) | 0000 (0) | 0100 (0) |
| lower left region | lower region | lower right region |
| 1010 (0) | 0010 (0) | 0110 (0) |

The relative position of any face edge to pyramid 250 can be found by examining the outcodes of the end points of the edge. If both vertices are behind the Zc=0 plane (that is behind the pilot's eye where Zc is negative), then sign $Z(1) = $ sign $Z(2) = 1$ and the face edge is not visible and can be rejected. If both vertices are in front of the Zc=0 plane (in front of the pilot's eye where Zc is positive), then sign $Z(1) = $ sign $Z(2) = 0$. If the face edge intersects the Zc=0 plane, then sign $Z1 \neq $ sign $Z2$. The intersection is found and only the portion of the edge extending in front of the pilot's eye need be considered.

Three further possiblities for the relative position of a face edge with respect to pyramid 250:

Case 1: Both ends of the face edge are within view. No clipping is necessary: OC(1)=0000(0), OC(2)=0000(0).

Case 2: One end of the face edge is within view and the other end is outside. The face edge intersects pyramid 250: OC(1)=0000(0) and OC(2)≠0000(0) or OC(1)≠0000(0) and OC(2)=0000(0).

Case 3: Both ends are outside pyramid of vision 250: OC(1)≠0000(0) and OC(2)≠0000(0).

In Case 3, definite decisions can be made only if the end points of the edge are either both to the right or both to the left (sign 1(1)=sign 1(2)=1(negative) or sign r(1)=sign r(2)=1(negative)). Furthermore, if OC(1)=OC(2)≠0000, both ends are outside, in the same region. In all these cases the face edge can be rejected. The rejection criteria can be expressed as a Boolean function (R) of the two out-codes. If R=0, none of the above rejection criteria are satisfied, and a part of the face edge boundary may go through image window 260.

Whenever Case 2 is found in the clipping process, the intersection of each face edge and pyramid of vision 250 is determined by window circuits 510 and the clipping portion of control 70 using a binary search technique. The algorithm for the search is as follows:

(A) Let the window coordinates of the vertex inside image window 260 be Vin and the outside coordinates be Vout.

(B) The midpoint between Vin and Vout is calculated.

(C) If the midpoint is within pyramid 250, Vin is replaced by the midpoint.

(D) If the midpoint is outside, Vout is replaced by the midpoint.

(E) The process continues until the distance of the midpoint from one side of pyramid 250 is less than the termination tolerance.

There remains the problem of modifying the edges of clipped faces. In some situations the intersections of the face edges and pyramid of vision 250 define the new face edge. In other situations one or more corners of the window must be inserted into the sequence of vertices to complete the closed polygon face.

In a special case all vertices are outside pyramid 250 and the edges do not intersect pyramid 250. There remains ambiguity as to whether the face is within view. Referring to FIG. 2b showing image window 262, 4 rays (R1, R2, R3, and R4) extend from the four corners (C1, C2, C3, and C4) of window 260. If a ray is intersected an odd number of times by the edges of the polygon face, then the corresponding corner is surrounded by the polygon. This technique can be implemented by inspecting the out-codes of the adjacent vertices defining each edge. The criterion for crossing the rays is very similar to the rejection criterion and is obtained by logical operations. As an example, R1 is crossed if sign t(1)=sign t(2)=1 and sign 1(1)≠sign 1(2).

SECTION XI

PROJECTION STAGE 64

GENERAL

Figure 6:
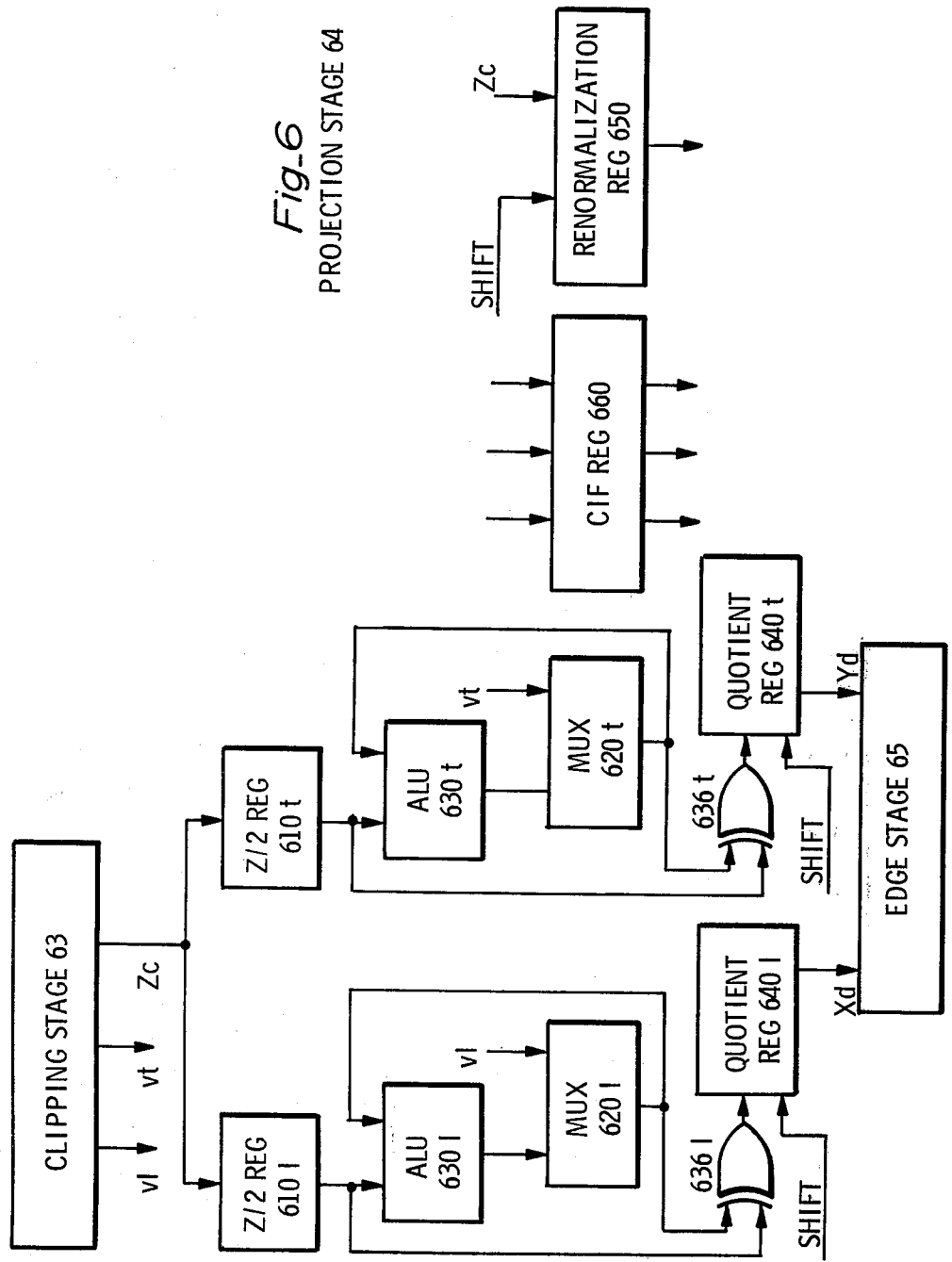
FIG. 6 is a block diagram of projection stage 64 wherein Xc and Yc are divided by Zc to project Vc into display plane.

FIG. 6 shows projection and clipping stage 64 of image processor 42 which projects three-dimensional window coordinates vl, vt, and Vz from clipping stage 63 into a two-dimensional vector Vd (Xd, Yd). The projected vectors Vd define the end points of each face edge for face generation stage 65. The projection is accomplished by dividing vl and vt by Zc through a binary division non-restoring technique (described in "Digital Arithmetic-I" by Y. Chu pages 39–43). Z/2 registers 610-1 and 610-t load the divisor Zc/2, and MUX/Register 620-1 and 620-t select and load the dividend vl/2 and vt/2 in response to control logic 70. The inputs to registers 610 and 620 are right-shifted by one digit to establish the division by two. Arithmetic logic unit ALU 630-1 and 630-t then receive the dividends through shift return loops 623-1 and 623-t, or subtract Zc/2 thereto in response to a ± function from logic 70. The dividend ±Zc/2 term is loaded into MUX's 620, returned to ALU's 630, and then combined with anchor ±Z/2. The output of ALU's is slew wired with respect to the input of MUX's 620 causing a division by two right shift. The vl/Vz and vt/Vz quotients are generated one bit at a time, MSB first, by comparing the sign bit (MSB) of Zc with the sign bit of the partial remainders with MUX 620 through sign gates 636-1 and 636-t. The quotient bits individually enter quotient registers 640-1 and 640-t, and are left-shifted by control logic 70. Zc on line 592 from range register 590 is loaded into renormalization register 650 and right-shifted by control logic 708 the same number of places as were left-shifted in normalizer 370 in translation stage 60. Color, intensity, and flag data on line 592 from CIF register 590 is loaded into CIF register 660 in response to control logic 70.

DETAILED DESCRIPTION

Vz12 register 610 may be a 24 bit register (four 74S174'S).

MUX/Registers 620 may be 24 bit 2:1 multiplexers (five 74S298'S) with storage.

ALU's 630 may be 16 bit flowthrough arithmetic logic units (four 74S181'S + one 74S182).

Sign gates 636 may be exclusive OR gates (74S86).

Quotient registers 640 may be 12 bit shift registers (three 74164'S) for receiving the projected data Xd and Yd one bit at a time as it is generated by ALU's 630.

Zc register 650 may be a 24 bit shift register (six 74S195'S).

CIF register 660 may be a series of 74S174's.

SECTION XII

EDGE STAGE 65

GENERAL

Figure 7:
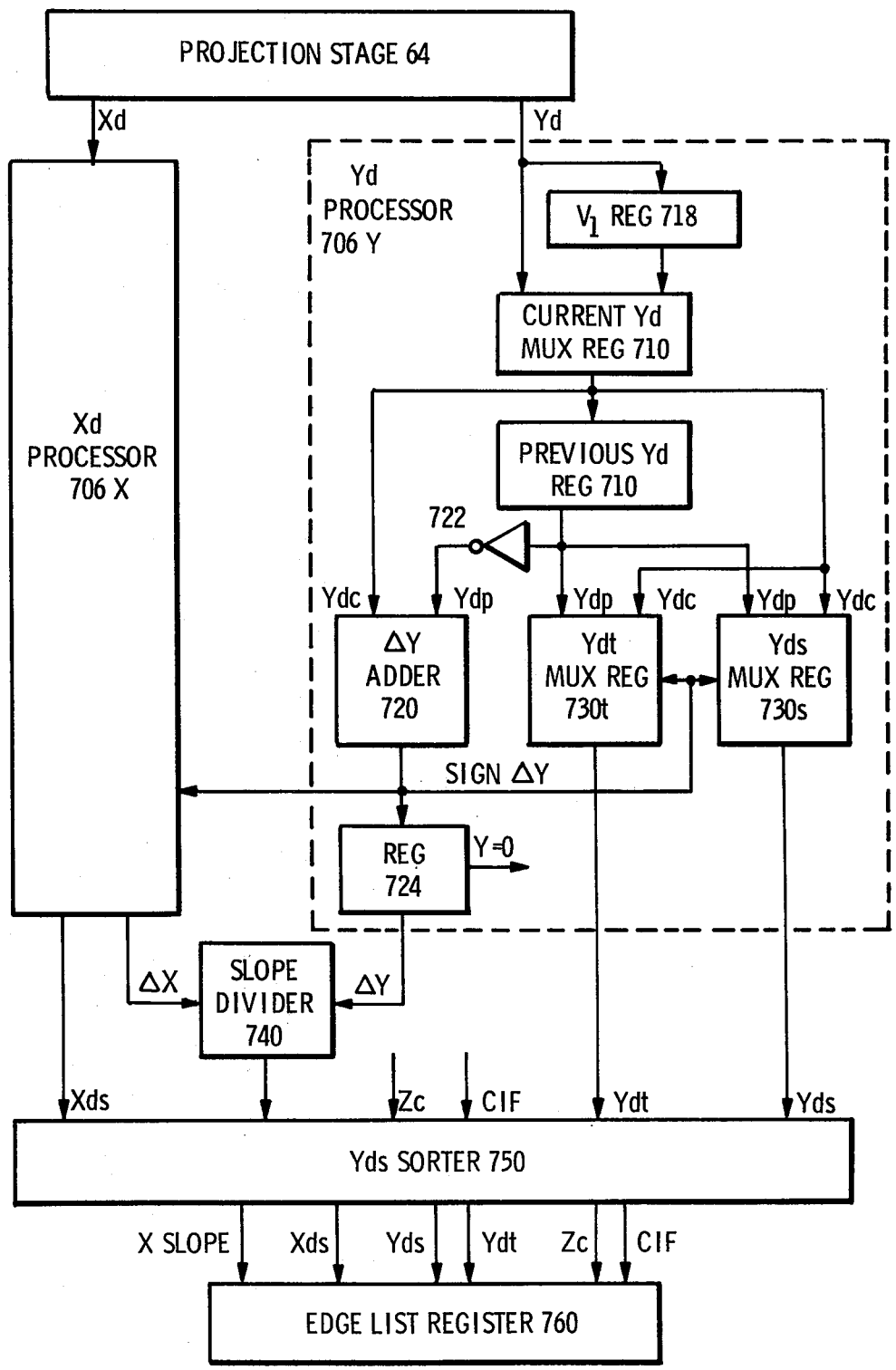
FIG. 7 is a block diagram of edge stage 65 which identifies the edge of each polygon face and the slopes thereof.

FIG. 7 shows edge stage 65 having Xd processor 706X and Yd processor 706Y which receive projected face vertex coordinates (Xd and Yd) from projection stage 64 and provides face edge lists to display generator 44. Each edge is defined by edge data including a starting point (Xds, Yds), the Y coordinate of the termination point (Ydt), plus the slope of the edge (delta X/delta Y).

The Y coordinates of each set of face vertices (Xd and Yd) are loaded into current Y mux-register 710 and advanced to previous Y register 716 in CCW order as defined in data base 48. Each current Y coordinate (Ydc) and previous Y coordinate (Ydp) are forwarded to adder 720 for calculating a delta Y for each face edge or pair of points (delta Y = Ydc − Ydp). Simultaneously, each Ydc and Ydp are entered into Y start multiplexer 730s and Y terminate multiplexer 730t. The starting Y coordinate Yds is the end point of each face edge that is scanned first on CRT 82; and the terminate Y coordinate Ydt is scanned last. In the embodiment shown, the conventional top to bottom scan is employed. Therefore, the start point Yds is always the smaller of the two adjacent points Ydc and Ydp. The sign bit of delta Y (SIGN ΔY) defines which is smaller, Ydc or Ydp, as follows:

| for + delta Y | for − delta Y |
|---|---|
| Ydc = Ydt, and Xdc = Xdt | Ydc = Yds, and Xdc = Xds |
| Ydp = Yds, and Xdp = Xds | Xdp = Xdt, and Xdp = Xdt | and activates multiplexers 730s and 730t accordingly. Slope divider 740 provides the slope of each edge face by computing delta X/delta Y for the corresponding pair of vertices.

The face edges are arranged in scan order by Yds sorter 750 according to the smallest Yds. Each edge data set is loaded into sorter 750 in CCW order and forwarded to image generator 44 in order of smallest Yds for accommodating the top to bottom scan.

DETAILED DESCRIPTION

Xd processor 706X has the same hardware as Yd processor 706Y, and is therefore not shown in detail.

Current Y mux-register 710 may be a 12 bit 2:1 multiplexer-register (three 74298's) for the current vertex of each face as the vertices are received in CCW order from quotient registers 640-1 and 640-t.

Previously Y register 716 may be a 12 bit storage register (two 74174s) for holding the vertex just preceding the current vertex.

First vertex Y register 718 may be a 12 bit storage register (two 74174s) for holding the first vertex while the intermediate vertices are processed. The first vertex is loaded into current mux-register 710 as the last vertex is advanced to previous vertex status to form the last edge of the face.

Adder 720 may be a 12 bit adder (three 74283s) for calculating delta Y=Ydc−Ydp, and forwarding SIGN Y to Y and X multiplexers-registers 730s and 730t.

Inverter 722 may be a 12 bit inverting buffer (two 74S04's) for inverting Ydp into -Ydp. The carry in on adder 720 is forced to 1 to complete the complement of Ydp.

Start point and terminate point multiplexer-register 730 may be 12 bit 2:1 multiplexer-registers (three 74298's each) for simultaneously holding both Ydc and Ydp available for selection as either Yds or Ydt.

Delta Y register 724 may be a 12 bit storage register (three 74S175's) for holding delta Yc while divider 740 forms the slope (delta Xp/delta Yp) for the previous edge. Additionally register 724 may include a zero detect circuit (one 74S30) for providing delta Y=0 to control 70 when the slope is horizontal and the edge may be omitted from further processing, Divider 740 may be a 12 input bit-20 output bit binary division nonrestoring divider as described in projection stage 64, for calculating slope=delta X/delta Y. The dividend delta X may be right shifted into additional shift register (one 74166) for scaling down the resulting slope to accommodate a Y increment of one raster line. In the embodiment shown the right shift is nine places to accomodate a 1024 scan line, interlaced display (2 to the 9th=512).

Sorter 750 may be a 12 bit key-96 bit non key sorter for output edge data in order ascending of Yds, formed by:

(a) a 16 word 12 bit key data RAM (three 74S189's) for receiving and storing the key data (Yds) in input order.
(b) a 16 word 5 bit pointer RAM (two 74S189's) for storing the RAM pointers.
(c) a three level pointer pushdown stock (two mux-registers 74298's—first level, one 74S174—second level, and one 74S174—third level) for manipulating pointers into sorted order each time a new key is received by the key data RAM.
(d) address counter (one 74161) and smallest key pointer register (one 74S174) for generating RAM addresses and storing the current smallest key RAM address.
(e) RAM address multiplexer (two 74S153's) and a pointer RAM input multiplexer (three 74S153's) which cooperates with the three level stack and address counter for selecting RAM addresses and the pointer RAM input.
(f) an existing key register (three 74S175's) and comparator (three 74S85's) for determining where to insert the input key among the existing key in the key data RAM. The existing key register also stores key data to be advanced to image generator 44.
(g) non key data output register (twenty-four 74S175's) for storing non key data (Xds, slope, Ydt, Zc, and CIF) to be advanced to image generator 44.

SECTION XIII

CONTROL LOGIC

Processor control logic 70 responds to instruction code and data flags contained in the data flow from data base 48 for processing the coordinate data through image processor 42. The flow tables described below disclose the logic involved in controlling each stage of image processor 42. Various hardware circuit configurations could incorporate this logic.

TRANSLATION STAGE
60--CONTROL LOGIC FLOW TABLE

I. TRANSFER INSTRUCTION WORD:
CONTROLLER 46 TO REGISTER 310

STEP IA: (1) Maintain LOAD signal on instruction register 310.
(2) Load next instruction from buffer register 306 into instruction register 310 (LOAD).

DECISION IA: Is image data available to translation stage 60 on data bus 307? (DAV)
YES--STEP IB    NO--STEP IA STEP IB: (1) Clear accumulator 370 (CLR).
(2) Clear scaler data "S" from scale register in scaler 360.
(3) Clear address counter 320A (CLR).
(4) Set DAR from control logic 70, wait for DAV from interface controller 46.

DECISION IB: Decode four MSB of instruction in register 310A to identify one of sixteen instructions (0-15).

II. LOAD X INSTRUCTION--LDX (0)

STEP IIA: (1) Load address counter 320A with four bits of address "A" (LOAD).
(2) Unit decrement word counter 320B (DEC).

DECISION IIA: DAV?
YES--DECISION IIB    NO--DECISION IIA

DECISION IIB: What is R?

| R = 1 (fine 16 bit) | R = 2 (coarse 16 bit) | R = 3 (normal 24 bit) |
|---|---|---|
| 1. Load 16 LSB from bus 307 into RAM 350X. | 1. Same as DECISION IIB (R = 1) 1 through 3 except load 16 MSB at 1. | 1. Load 16 LSB from bus 307 into RAM 350X. |
| 2. Load zeros into RAMs 350 Y and Z. | . | 2. Request DAR, wait for DAV. |
| 3.a. Unit increment address counter 320A (INC). | . | 3. Load 8 MSB from bus 307 into RAM 350X. |
| 3.b. Unit decrement word counter 320B (DEC). | . | 4. Load zeros into RAMs 350 Y and Z. |
| 3.c. Set DAR, wait for DAV. | . | 5. Same as DECISION IIB (R = 1)3. |
| 4. DECISION IIC. | 2. DECISION IIC. | 6. DECISION IIC. |

DECISION IIC: Is word count in register 320 B = 0?
YES--STEP IA    NO--DECISION IIA

III. LOAD Y INSTRUCTION--LDY (1)

STEP IIIA: Same as STEP IIA.
DECISION IIIA: DAV?
YES--DECISION IIIB    NO--DECISION IIIA DECISION IIIB: What is R?

| R = 1 | R = 2 | R = 3 |
|---|---|---|
| 1. Load 16 LSB from bus 307 into RAM 350Y. | 1. Same as DECISION IIIB (R = 1)1 through 3 except load 16 MSB at 1. | 1. Load 16 LSB from bus 307 into RAM 350Y. |
| 2. Load zeros into RAMs 350 X and Z. | . | 2. Set DAR, wait for DAV. |
| 3. Same as DECISION IIB (R = 1)3. | . | 3. Load 8 MSB from bus 307 into RAM |

-continued
TRANSLATION STAGE 60--CONTROL LOGIC FLOW TABLE

|  |  |  |
|---|---|---|
|  |  | 350X. |
|  |  | 4. Load zeros into RAMs 350 X and Z. |
|  |  | 5. Same as DECISION IIB (R = 1)3. |
| 4. DECISION IIIC. | 2. DECISION IIIC. | 6. DECISION IIIC. |

DECISION IIIC: Is word count in register 320 B = 0?
    YES--STEP IA    NO--DECISION IIIA

IV. LOAD Z INSTRUCTION--LDZ (2)

| STEP IVA: | Same as STEP IIA. | |
|---|---|---|
| DECISION IVA: | DAV? | |
|  | YES-- DECISION IIB | NO-- DECISION IVA |
| DECISION IVB: | What is R? | |

| R = 1 | R = 2 | R = 3 |
|---|---|---|
| 1. Load 16 LSB from bus 307 into RAM 350Z. | 1. Same as DECISION IVB (R = 1) 1 through 3, except load 16 MSB at 1. | 1. Load 16 LSB from bus 307 into RAM 350Z. |
| 2. Load zeros into RAMS 350 X and Y. | | 2. Set DAR, wait for DAV. |
| 3. Same as DECISION II (R = 1)3. | | 3. Load 8 MSB from bus 307 into RAM 350Z. |
|  |  | 4. Load zeros into RAMs 350 X and Y. |
|  |  | 5. Same as DECISION IIB (R = 1)3. |
| 4. DECISION IVC. | 2. DECISION IVC. | 6. DECISION IVC. |

DECISION IVC: Is word count in register 320 B = 0?
    YES--STEP IA    NO--DECISION IVA

V. LOAD XY INSTRUCTION--LXY (3)

| STEP VA: | Same as STEP IIA. | |
|---|---|---|
| DECISION VA: | DAV? | |
|  | YES-- DECISION VB | NO-- DECISION VA |
| DECISION VB: | What is R? | |

| R = 1 | R = 2 | R = 3 |
|---|---|---|
| 1. Load 16 LSB from bus 307 into RAM 350X. | 1. Same as DECISION VB (R = 1) 1 through 5, except load 16 MSB at 1 and 3. | 1. Load 16 LSB from bus 307 into RAM 350X. |
| 2. Set DAR, wait for DAV. | | 2. Set DAR, wait for DAV. |
| 3. Load 16 LSB from bus 307 into RAM 350Y. | | 3. Load 8 MSB from bus 307 into RAM 350X. |
| 4. Load zeros into RAM 350Z. | | 4. Set DAR, wait for DAV. |
| 5. Same as DECISION IIB (R = 1)3. | | 5. Load 16 LSB from bus 307 into RAM 350Y. |
|  |  | 6. Set DAR, wait for DAV. |
|  |  | 7. Load 8 MSB from bus 307 into RAM 350Y. |
|  |  | 8. Load zeros into RAM 350Z. |
|  |  | 9. Same as DECISION IIB (R = 1)3. |
| 6. DECISION VC. | 2. DECISION VC. | 10. DECISION VC. |

DECISION VC: Is word count in register 320 B = 0?
    YES--STEP IA    NO-DECISION VA

VI. LOAD A INSTRUCTION--LDA (4)

| STEP VIA: | Same as STEP IIA. | |
|---|---|---|
| DECISION VIA: | DAV? | |
|  | YES-- DECISION VIB | NO-- DECISION VIA |
| DECISION VIB: | What is R? | |

| R = 1 | R = 2 | R = 3 |
|---|---|---|
| 1. Load 16 LSB from bus 307 into RAM 350X. | 1. Same as DECISION VIB (R = 1) 1 through 6, except load 16 MSB at 1, 3, and 5. | 1. Load 16 LSB from bus 307 into RAM 350X. |
| 2. Set DAR, wait for DAV. | | 2. Set DAR, wait for DAV. |
| 3. Load 16 LSB from bus 307 into RAM 350Y. | | 3. Load 8 MSB from bus 307 into RAM 350X. |
| 4. Set DAR, wait for DAV. | | 4. Set DAR, wait for DAV. |
| 5. Load 16 LSB from bus 307 into RAM 350Z. | | 5. Load 16 LSB from bus 307 into RAM 350Y. |
| 6. Same as DECISION IIB (R = 1)3. | | 6. Set DAR, wait for DAV. |
|  |  | 7. Load 8 MSB from bus 307 into RAM 350Y. |
|  |  | 8. Set DAR, wait for DAV. |
|  |  | 9. Load 16 LSB from bus 307 into RAM 350Z. |
|  |  | 10. Set DAR, wait for DAV. |
|  |  | 11. Load 8 MSB from bus 307 into RAM 350Z. |
|  |  | 12. Same as DECISION IIB (R = 1)3. |
| 7. DECISION VIC. | 2. DECISION VIC. | 13. DECISION VIC. |

DECISION VIC: Is word count in register 320 B = 0?
    YES--STEP IA    NO--VIA

RECALL X--RCX (5)

STEP VIIA: Clear address counter 320A (CLR).
DECISION VIIA: DAV?

TRANSLATION STAGE
60--CONTROL LOGIC FLOW TABLE

| | YES--<br>DECISION VIIB | NO--<br>DECISION VIIA |
|---|---|---|
| DECISION VIIB: | What is R? | |
| | R = 2 (16 bit) | R = 3 (24 bit) |
| | 1. Load 16 MSB from bus 307 into RAM 350X. | 1. Load 16 LSB from bus 307 into RAM 350X. |
| | 2. Set DAR, wait for DAV. | 2. Set DAR, wait for DAV. |
| | | 3. Load 8 MSB from bus 307 into RAM 350X. |
| | | 4. Set DAR, wait for DAV. |
| | 3. STEP XIIA. | 5. STEP XIIA. |

VIII. RECALL Y--RCY (6)

STEP VIIIA: Clear address counter 320A (CLR).
DECISION VIIIA: DAV?

| | YES-- | NO-- |
|---|---|---|
| | DECISION VIIIB | DECISION VIIIA |
| DECISION VIIIB: | What is R? | |
| | R = 2 (16 bit) | R = 3 (24 bit) |
| | 1. Load 16 MSB from bus 307 into RAM 350Y. | 1. Load 16 LSB from bus 307 into RAM 350Y. |
| | 2. Set DAR, wait for DAV. | 2. Set DAR, wait for DAV. |
| | | 3. Load 8 MSB from bus 307 into RAM 350Y. |
| | | 4. Set DAR, wait for DAV. |
| | 3. STEP XIIA. | 5. STEP XIIA. |

IX. RECALL Z--RCZ (7)

STEP IXA: Clear address counter 320A (CLR).
DECISION IXA: DAV?

| | YES-- | NO-- |
|---|---|---|
| | DECISION IXB | DECISION IXA |
| DECISION IXB: | What is R? | |
| | R = 2 (16 bit) | R = 3 (24 bit) |
| | 1. Load 16 MSB from bus 307 into RAM 350Z. | 1. Load 16 LSB from bus 307 into RAM 350Z. |
| | 2. Set DAR, wait for DAV. | 2. Set DAR, wait for DAV. |
| | | 3. Load 8 MSB from bus 307 into RAM 350Z. |
| | | 4. Set DAR, wait for DAV. |
| | 3. STEP XIIIA. | 5. STEP XIIA. |

X. RECALL XY--RXY (8)

STEP XA: Clear address counter 320A (CLR).
DECISION XA: DAV?

| | YES-- | NO-- |
|---|---|---|
| | DECISION XB | DECISION XA |
| DECISION XB: | What is R? | |
| | R = 2 (16 bit) | R = 3 (24 bit) |
| | 1. Load 16 MSB from bus 307 into RAM 350X. | 1. Load 16 LSB from bus 307 into RAM 350X. |
| | 2. Set DAR, wait for DAV. | 2. Set DAR, wait for DAV. |
| | 3. Load 16 MSB from bus 307 into RAM 350Y. | 3. Load 8 MSB from bus 307 into RAM 350X. |
| | 4. Set DAR, wait for DAV. | 4. Set DAR, wait for DAV. |
| | | 5. Load 16 LSB from bus 307 into RAM 350Y. |
| | | 6. Set DAR, wait for DAV. |
| | | 7. Load 8 MSB from bus 307 into RAM 350Y. |
| | | 8. Set DAR, wait for DAV. |
| | 5. STEP XIIA. | 9. STEP XIIA. |

XI. RECALL A--RCA (9)

STEP XIA: Clear address counter 320A (CLR).
DECISION XIA: DAV?

| | YES-- | NO-- |
|---|---|---|
| | DECISION XIB | DECISION XIA |
| DECISION XIB | What is R? | |
| | R = 2 (16 bit) | R = 3 (24 bit) |
| | 1. Load 16 MSB from bus 307 into RAM 350X. | 1. Load 16 LSB from bus 307 into RAM 350X. |
| | 2. Set DAR, wait for DAV. | 2. Set DAR, wait for DAV. |
| | 3. Load 16 MSB from bus 307 into RAM 350Y. | 3. Load 8 MSB from bus 307 into RAM 350X. |
| | 4. Set DAR, wait for DAV. | 4. Set DAR, wait for DAV. |
| | 5. Load 16 MSB from bus 307 into RAM 350Z. | 5. Load 16 LSB from bus 307 into RAM 350Y. |
| | 6. Set DAR, wait for DAV. | 6. Set DAR, wait for DAV. |
| | | 7. Load 8 MSB from bus 307 into RAM 350Y. |
| | | 8. Set DAR, wait for DAV. |
| | | 9. Load 16 LSB from bus 307 into RAM 350Z. |
| | | 10. Set DAR, wait for DAV. |
| | | 11. Load 8 MSB from bus 307 into RAM 350Z. |
| | | 12. Set DAR, wait for DAV. |
| | 7. STEP XIIA. | 13. STEP XIIA. |

XII. RECALL LOAD--RCL (10)

STEP XIIA: (1) Load accumulator 370 (X, Y, and Z) with "Vo" from RAM 350 (X, Y, and Z) at address A = 0.
(2) Unit increment address counter 320A (INC).
(3) Load accmulator 370 (X, Y, and Z) with "-Vp" from RAM 350 (X, Y, and Z) at address A = 1 to form Vt = Vo-Vp.
(4) Unit decrement word counter 320B (DEC).

DECISION XIIA: Is the face part of a three dimensional object (is 3D flag set)?
YES--STEP XIIB    NO--STEP XIIE
(Three dimensional case)    (Two dimensional case)

STEP XIIB: (1) Wait for DAV.
(2) Load Three D register 341 (LOAD).
(3) Set DAR, wait for DAV.
(4) DECISION XIIB.

DECISION XIIB: Is word count ≧ 4? Vertex pointers are packed four to one sixteen bit word
YES--STEP XIIC    NO--STEP XIID

TRANSLATION STAGE
60—CONTROL LOGIC FLOW TABLE

| | |
|---|---|
| STEP XIIC: | (1) Wait for DAV. |
| | (2) Load Three D register 342. |
| | (3) Set DAR, wait for DAV. |
| | (4) STEP XIID. |
| STEP XIID: | (1) Load address counter 320A with first vertex pointer "A" from register 310A. |
| | (2) Load scaler 360 with "S" from register 310B. |
| | (3) Load accumulator 370 with the $\Delta V$ data from RAM 350 as accessed by the pointer from the Three D buffers. |
| | (4) Clear address counter 320A. |
| | (5) Wait for DAR-T from Normalizer 380. |
| | (6) Enable FIRST VERTEX flag in CIF register. |
| | (7) Load the buffer register in accumulator 370 with the contents of the accumulator (LOAD-B). |
| | (8) Clear "S" register in scaler 360. |
| | (9) Clear accumulator 370. |
| | (10) Unit decrement word counter 320B. |
| | (11) Load H and N address register 386 with "A" (LOAD). |
| | (12) Load accumulator 370 with Vo. |
| | (13) Unit increment address counter 320A. |
| | (14) Load accumulator 370. |
| | (15) Load address counter 320A with vertex address from Three D register 341 or 342. |
| | (16) Load scale register within scaler 360. |
| | (17) Load accumulator 370. |
| | (18) Clear address counter 320A. |
| | (19) Wait for DAR-T. |
| | (20) Repeat items 7, 8, 9, and 10 of STEP XIID. |
| | (21) Same as STEP XIID items 12-19. |
| | (22) Same as STEP XIID items 7-10. |
| | (23) Load last vertex flag into CIF registers B = 0. |
| | (24) DECISION XIID. |
| DECISION XIID: | Is word count B = 0? |
| | YES--STEP IA    NO--DECISION XIIE (Visibility Test) |
| STEP XIIE: | (1) Same as STEP XIID items 1 and 2. |
| | (2) Wait for DAR-T. |
| | (3) Same as STEP XIID item 7. |
| | (4) Set first vertex flag. |
| | (5) Load accumulator 370. |
| | (6) Increment adress counter 320A. |
| | (7) Decrement word counter 320B. |
| | (8) DECISION XIIC. |
| DECISION XIIC: | Is word count B = 0? |
| | YES--STEP IA    NO--STEP XIIF |
| STEP XIIF: | (1) Wait for DAR-T. |
| | (2) Same as STEP XIIE items 4-7 except set last vertex flag when B = 0. |
| | (3) DECISION XIIC. |
| DECISION XIIE: | What is Result of Resolvability Test? |
| | $\Theta min > \Theta rc$--STEP IA    $\Theta min < \Theta$--STEP XIIG |
| STEP XIIG: | (1) same as STEP XIID items 20-23. |
| | (2) DECISION XIIF |
| DECISION XIIF: | Is word count B = 0? |
| | YES--STEP IA    NO--STEP XIIG |

XII. COLOR INTENSITY FLAG—CIF (11)

In this instruction the CIF registers are loaded with CIF data from bus 307. Word counter 320B is decremented after each load until B=0.

XIV. STRING INSTRUCTION—STG (12)

In this instruction the initial face of a string of faces is processed from RAM 350 through translation stage 60 into rotation stage 62 as a string of light points or four sided faces. The vertices of the four sided faces are retrieved from RAM 350 in CCW order as described in "XI. RECALL A—RCA (9)."

XV. LOAD H—LDH (13)

In this instruction rotation data is loaded into H address register 3 from data bus 307, and then into H/N RAM 410 as described in Section VI. H/N Ram 410 receives the data during an idle portion of its cycle.

XVI. LOAD RD—LRD (14)

In this instruction resolvability data (RD) is loaded into RD RAM 1304 as described in Section XV.

ROTATION STAGE 62

FIG. 8A shows the logic-diagram for the processing of translated point coordinates (Vt) from translation stage 62. Each new Vt is loaded into multiplexers 416X, Y, and Z (Step I). The object code in CIF register 460 which accompanies each new Vt is examined to determine if the new Vt is associated with a 3D face. The vertex of visible 3D faces and non-3D face vertices are multiplied by the three $\times$ three X matrix in RAMs 410X, Y, and Z to provide the rotated vector Vc-Zc first, Yc second, and Xc last (Step II). Each coordinate is loaded into registers 450X, Y, and Z as they are calculated (Decision A and B, Steps III, IV, and V.

CLIPPING STAGE 63

FIGS. 8 B and C show the logic diagram for the control of clipping stage 63. The first point coordinates are loaded into multiplexers 520 (Step 2) and the outcode (OC) for each point is determined by window circuits 510. The object code in CIF register 590 is examined to determine whether the first coordinate is really a polygon vertex (or line end point) or merely a single light point (Decision A). In the case of vertices (and end points), the next vertex (or other end point) is loaded and outcode (OC) determined (Step 4). The OC's are examined to determine if the edge defined by the two vertices crosses the Z=0 plane (Decision C). If the edge crosses the Z=0 plane, then the intersection point is determined by a binary search (Step 5). If the edges do not cross the Z=0 plane, then the OC's of both points are examined to determine if they both are in front of pilot's eye 220 (Z=0 plane) or behind pilot's eye 220 and therefore definitely not visible (Decision D). The endpoints of edges which intersect the Z=0 plane or which are completely in front thereof, are examined via their OC for visibility (Decisions F, G, and H, and Step 8). If both endpoints are out of view (Case 3) the OC's are examined to determine if clipping is required (Decision I). If both endpoints are in view (Case 1) or otherwise do not require clipping, the next vertex coordinates are loaded. If only one vertex is in view (Case 2) or clipping is otherwise required (Case 3), the edge is processed through the appropriate series of binary search routines based on the OC's (Decision J). The binary search routines determine the interception points of the edge with the left, right, bottom or top boundaries of image plane 262. Each interception point becomes a new vertex of a new polygon formed by the visible portion of the original polygon face.

EDGE STAGE 65

FIG. 8D shows the logic diagram for the control of projection stage 64, processor 706X and Y, and slope divider 740. The clipped points from clipping stage 63 are loaded into registers 610 for projection division (Step 1). The quotients (projected points) are forwarded from registers 640 to edge stage 65, where it is examined for face data (Decision A). Non face data such as points and line segments are forwarded immediately to FIFO memory 910. Each face data point is examined for a first vertex (Decision B), which are loaded in V1 register 718 and current Yd multiplier register 710 (Step 2). Each non first vertex is loaded into register 710 as the current Yd and the previous Yd is advanced to register 716 (Step 3). Xd is similarly processed through processor 706X. Delta X and delta Y are calculated from their current and previous values, and loaded into registers 724 (Step 4). When the last vertex becomes the previous vertex in register 716 (Decision C), the face is closed by advancing V1 from register 718 to register 710 as the current vertex (Step 5). The last slope is calculated from the previous vertex (Vlast) and the current vertex (V1) and entered into register 724. The slopes are calculated by slope divider 740 as the delta X's and delta Y's are provided (Step 6).

Figure 8E:
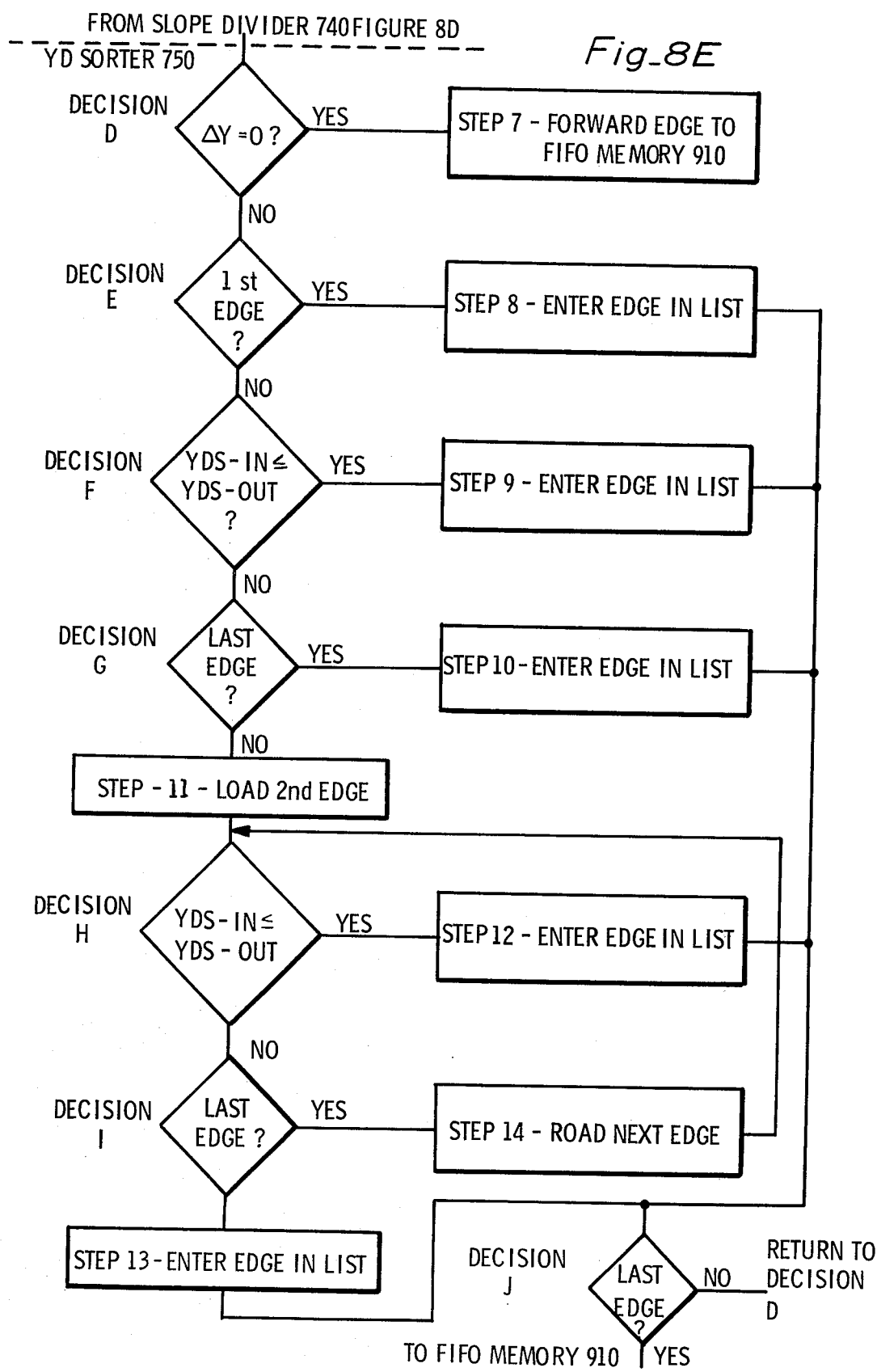

FIG. 8E shows the logic diagram for the control of Yds sorter 750. Input face edges are loaded into sorter 750 and examined for horizontal edges—delta Y=0 (Decision D). Horizontal edges are forwarded to FIFO memory 910 (Step 7). The non horizontal edges are examined for a first edge (Decision E). The first edge is entered at the start of the sort list (Step 8). Non first edges are examined to determine whether the input Yds is less than the last or output Yds in sorter 750 (Decision F). Smaller input Yds are entered at the start of the sort list (Step 9). Larger Yds are examined for a last edge (Decision G). Last edge is entered in last place of sort list (Step 10). The second edge is loaded (Step 11) and examined for input Yds less than the last Yds in sorter 750 (Decision H). Smaller Yds are inserted in the sort list (Step 12). Larger Yds are examined for last edge (Decision I). Last edges are entered into the sort list (Step 13). If the input edge is not the last edge, the next edge is loaded (Step 14). The input edge is again examined for a last edge (Decision J)—return to Decision D of flow chart for non last edge, and output sorter 750 to FIFO memory 910 for last edge.

SECTION XIV

DISPLAY GENERATOR 44

TEXTURE STAGE 72

Texture Stage 72, shown in FIG. 9, provides miniraster data for the set of horizontal scan lines forming each face. The miniscan lines progressively increase and/or decrease in response to the face edge list (Xds, Yds, Xslope, and Ydt for each edge) from face generation stage 65. The miniraster data for each miniscan line includes the Xd coordinate of the left hand end point (XdL), the width of the miniscan line (W), the Yd coordinate (Yd scan), Zc and CIF.

The edge list is loaded into memory 910 in ascending Yd order by face order once each frame, and extracted in the same order twice each frame—once for the field of even miniscan lines, and once for the field of odd miniscan lines. X coordinates generators 920L and 920R provide XdL and XdR respectively for each miniscan line by combining Xds with the Xslopes of the two opposed edges of the face which contain the end points of the scan line. XdLs is incremented by the left hand slope (XL slope) to form each XdL, and XdRs is incremented by the right hand slope (XR slope) to form each XdR. Only generator 920 is shown in detail. Slope multiplexer 928 divides the XL slope by two (select START) for the first scan line of the even field, to accomodate the one half scan height displacement between the interlaced odd and even fields on display 82. During the remainder of the display cycle, the XL slope is passed through slope multiplexer 928 without division (select ACC) to accomodate the proper height spacing between adjacent miniscan lines in the same field. Adder 930 combines the X coordinate of the previous scan line (XdLp) with the current XL slope to provide the current X coordinate (XdLc). Output multiplexer register 940 provides either XdLs (select START) or XdLc (select ACC) to miniraster data register 950. Subtractor 952 provides the width W of each scan line by subtracting XdLc from XdRc (output of generator 920R). The Y coordinate of the miniscan lines (Yd scan) is similarly formed by incrementing Yds with Yslope from Yslope generator 960. At the end of each edge, Yd scan equals or exceeds the Ydt on the left edge (YdLt) or right edge (YdRt). The signals Yd scan $\geq$ YdLt and Yd scan $\geq$ YdRt indicate to control logic 70 that the next XL slope or XR slope is required in Xd generators 920.

DETAILED DESCRIPTION

FIFO memory 210 may be a 2048 words×100 bits memory (two hundred 82S11's) for sequentially outputting the complete edge list twice each cycle. Memory 210 interfaces with the remainder of miniraster calculator 72 through a 100 bit register (twenty five 74S175's).

XL slope register 924 may be a 20 bit storage register (five 74S175's) for holding each new Xslope as they are provided by memory 910.

XL slope multiplexer 928 may be a 20 bit 2:1 multiplexer (five 74S157's) with the START input right shifted to provide a division by two. The START and ACC select are provided by control logic 70.

XL Adder 930 may be a 20 bit adder (five 74283's) for incrementing each previous X left coordinate (XdLp) by the current XL slope.

Limit multiplexer 934 may be a 20 bit 4:1 multiplexer (ten 74S153's) for preventing underflow and overflow when an edge approaches the display boundry. The four inputs are XdLc (twice), all ones (overflow), and all zeros (underflow). The two select inputs are the sign bits of XdLc and XL slope. Underflow occurs when both sign XdLc and sign XL slope are negative. Overflow occurs when sign XdLc is negative and sign XL slope is positive.

XdLs register 938 may be a 12 bit register (three 74S175's) for holding the X coordinate of the starting end point of the current edge (Xds) as it is provided by FIFO memory 910.

Output multiplexer register 940 may be a 20 bit 2:1 multiplexer register (five 25S09's) for accumulating XdLc and outputting either XdLs or XdLc. The output is returned to adder 930 and forwarded to miniraster data register 950.

Miniraster data register 950 may be a 76 bit register (nineteen 74S175's) for holding the miniraster data (XdLc 12 bits, W 12 bits, Yd scan 12 bits, CIF 24 bits, and Z 16 bits.

Subtractor 952 may be a 12 bit subtractor (three 74283's and two 74S04's) for providing the width of each miniscan line (W=XdRc−XdLc) to register 950.

Yslope generator 960 may be a 12 bit register (three 74S175's) hardwired to specify the maximum number of miniraster scan lines per frame. This number defines the scan density or Yslope.

Yslope multiplexer 964 may be a 12 bit multiplexer (two 74S157's) similar in function to Xslope multiplexer 928.

Y Adder 986 may be a 12 bit adder (three 74283's) for combining the 12 bits of Yslope with the 12 bits of Y coordinate of the previous scan line (Ydp) to form the Y coordinate of the current scan line (Yd scan).

Multiplexer register 970 may be a 12 bit multiplexer register (three 25S09's) similar in function to output multiplexer register 940.

Ydt register 974 may be a pair of 12 bit registers (six 74S175's) for holding the Yd coordinates of the left hand edge termination point (YdLt) and the right hand edge termination point (YdRt) which are periodically forwarded by FIFO memory 910.

Comparator 978 may be a pair of 12 bit comparators (six 74S85's) for comparing Yd scan with YdLt and YdRt to determine the end of each edge.

DEFLECTION CONTROL 74

Deflection stage 74 receives Yd scan accompanied by a series of XdLc's and W's for generating the sweep voltages which provide the series of horizontal scan lines outlining each polygon face. Yd scan identifies vertical position of the first vertex. XdL identifies the left hand start of each scan line thereafter. W determines the length of each scan line. Conventional integrator techniques may be employed to provide the appropriate X and Y ramp deflection voltages. The Y ramp changes at a uniform rate starting at Yd scan to move the CRT beam vertically across the face being displayed. The X ramps change at a much faster rate starting from an XdL to move the beam horizontally a distance indicated by the associated W. Suitable deflection techniques are disclosed in detail in U.S. Pat. No. 3,999,308 entitled "Real-Time Simulation of a Point System Having Textured Areas as Viewed by a Moving Observer" issued on Dec. 28, 1976 to Robert Louis Peters.

VIDEO CONTROL 76

Video control 76 receives color and intensity data from CIF 660 in projection stage 64 for each face being displayed to control the color and display brightness of the scan lines forming that face. If desired, the display intensity may be attenuated by Zc data for range simulation. Suitable video control techniques are also disclosed in detail in U.S. Pat. No. 3,999,308.

FULL RASTER EMBODIMENT

If desired, the edge list from register 760 may be displayed on a full raster in the conventional frame manner across the entire screen of display device 82. The vertices of all visible polygon faces (or visible portions thereof) for each frame are sorted by Yds to arrange the vertices in display order by raster. Next, the contents of each scan line are sorted by Xds to arrange the vertices in display order by raster. Next, the contents of each scanline are sorted by Xds to arrange the vertices in order to display within each scanline. The resulting Yds-Xds sorted edge list with accompanying slope and Yds data is processed through a conventional full raster display generator which provides the necessary vertical and horizontal sweep voltage waveforms.

SECTION XV
RESOLVABILITY STAGE 58

In order to facilitate resolution testing, each face is approximated by a rectangular coplanar therewith. FIG. 10A shows a typical object face 1000 formed by vertices V0, V1, V2, V3, V4, and V5, with rectangle of convenience 1010, having a long side $\overline{S}$ major corresponding to the major dimension 1014 of object face 1000, and a shorter side $\overline{S}$ minor corresponding to the minor dimension 1018 of face 1000 and orthogonal to major dimension 1014. Rectangle of convenience 1010 is projected onto projection plane 260 to form projected quadraletreal 1010p (not shown) and then normalized onto normalization projection plane 1030 forming normalized quadralateral 1010n. Normalization plane 1030 is parallel to projection plane 260 and unit $\overline{v}$ away from observation point 220 along Vt. Quadralateral 1010n has two maximum angular subtenses (see FIG. 10B): $\theta$o formed across Won (which is the greatest dimension of 1010n perpendicular to $\overline{on}$), and $\theta$y formed across Wyn (which is the greatest dimension of 1010n perpendicular to $\overline{yn}$). The lesser of these two angles, $\theta$ min, determines whether object face 1000 can be resolved by display device 82 and should be processed further. $\theta$ min is compared to $\theta$rc defined by the resolution code Rc from data base 48.

MATHEMATICAL DEVELOPMENT OF THE RESOLUTION TEST $\theta$y and $\theta$o are computed for each face based on the following fundamental trigonometric principles:

$$\overline{S} \text{ major} = S \text{ major} \cdot \overline{o}, \quad \text{(Eq. XV-1)};$$

$$\overline{S} \text{ minor} = S \text{ minor} \cdot \overline{y}, \quad \text{(Eq. XV-2)}$$

where S major and S minor are scalor values for the rectangle of convenience 1010 of each face, and $\overline{o}$ and $\overline{y}$ are unit vectors extending from Vo defining the orientation of $\overline{S}$ major and $\overline{S}$ minor respectively. The log of $\overline{S}$ major, the log of $\overline{S}$ minor, $\overline{o}$, and $\overline{n}$ form the resolvability data block stored in data base 48 along with the initial vertex $\overline{V}o$ for each face. Unit vector $\overline{n}$ is normal to the plane of the face. Unit vector $\overline{y}$ is not provided in data base 48, but is useful in the determination of $\theta$ min.

The minimum projected, normalized dimensions $\overline{W}$ min of object face 1000 will be either Won or Wyn (see FIG. 10B) depending on the orientation of object face 1000. In the example illustrated in FIG. 10, $\overline{W}$ min is Won perpendicular to $\overline{on}$. The angular subtense of $\overline{W}$ min is $\theta$o in the FIG. 10B case. The small angle involved may be approximated by its tangent:

$$\theta \text{ min} \simeq \tan(\theta o) = Wop/D = Won, \quad \text{(Eq. XV-3)},$$

where D is the absolute value of $\overline{V}t$, the vector extending from the observation point 220 to Vo ($\overline{V}t = Vo - Vp$).

ANGULAR SUBTENSE $\theta$ min

The projection of orientation vector $\overline{o}$ onto projection plane 260 (perpendicular to $\overline{V}t$ and including Vo) is $\overline{o}p$, and:

$$\overline{o}p = \overline{o} + k \cdot \overline{v}, \quad \text{(Eq. XV-4)}.$$

Since $\bar{o}p$ is perpendicular to $\bar{v}$ their scalor product is zero:

$$\bar{o}p.\bar{v}=0, \quad \text{(Eq. XV-5)}.$$

Substituting (XV-4) into (XV-5):

$$(\bar{o} + k \cdot \bar{v}) \cdot \bar{v} = 0 \text{ and} \quad \text{(Eq. XV-6)}.$$

$$K = -\frac{\bar{v} \cdot \bar{o}}{\bar{v} \cdot \bar{v}} = -\frac{\bar{v} \cdot \bar{o}}{1},$$

Substituting (XV-6) into (XV-4):

$$\bar{o}p = \bar{o} - (\bar{v}.\bar{o})\bar{v}, \quad \text{(Eq. XV-7)}.$$

Similarly the projection of unit vector $\bar{y}$ onto projection plane 260 is:

$$\bar{y}p = \bar{y} - (\bar{v}.\bar{y})\bar{v}, \quad \text{(Eq. XV-8)}.$$

The width $\overline{W}op$ of projected face 1010p is perpendicular to $\bar{o}p$ in the plane of $\bar{o}p:\bar{y}p$ (projection plane 260):

$$\overline{W}op = (S \text{ minor}).\bar{y}p + k.\bar{o}p, \quad \text{(Eq. XV-9)}.$$

Since $\overline{W}op$ is perpendicular to $\bar{o}p$ their scalor product is zero, and:

$$\overline{W}op.\bar{o}p = (S \text{ minor})(\bar{y}p.\bar{o}p) + k(\bar{o}p.\bar{o}p) = 0, \quad \text{(Eq. XV-10)};$$

$$\text{and } k = -(S \text{ minor})\frac{\bar{y}p \cdot \bar{o}p}{\bar{o}p \cdot \bar{o}p}, \quad \text{(Eq. XV-11)}.$$

Substituting (XV-11) back into (XV-9):

$$\overline{W}op = (S \text{ minor})\left(\bar{y}p - \frac{\bar{y}p \cdot \bar{o}p}{\bar{o}p \cdot \bar{o}p} \cdot \bar{o}p\right), \quad \text{(Eq. XV-12)}.$$

In order to calculate $|\overline{W}op|$, the absolute value of $\overline{W}op$, $\overline{W}op^2$ must first be computed:

$$\overline{W}op^2 = (S \text{ minor})^2 \left[\bar{y}p^2 - \frac{2(\bar{y}p \cdot \bar{o}p)}{\bar{o}p^2} + \frac{(\bar{y}p \cdot \bar{o}p)^2 \cdot \bar{o}p^2}{\bar{o}p^2 \cdot \bar{o}p^2}\right], \quad \text{(Eq. XV-14)}.$$

$$\overline{W}op^2 = (S \text{ minor})^2 \left[\bar{y}p^2 - \frac{(\bar{y}p \cdot \bar{o}p)^2}{\bar{o}p^2}\right],$$

Substituting (XV-7) into (XV-8) and simplifying with $\bar{y}^2 = \bar{o}^2 = \bar{v}^2 = 1$ (the square of a unit vector is equal to unity) and $\bar{o}.\bar{y}=0$ (the scalor product of perpendicular vectors is zero):

$$\overline{W}op^2 = (S \text{ minor})^2 \left[1 - \frac{(\bar{y} \cdot \bar{v})^2}{1-(\bar{o} \cdot \bar{v})^2}\right], \quad \text{(Eq. XV-15)}.$$

By defining the angle between $\bar{o}$ and $\bar{v}$ to be $\theta a$ (the orientation angle of face 1000) as shown in FIG. 10C, and the angle between $\bar{y}$ and $\bar{v}$ to be $\theta b$, and the angle between $\bar{n}$ and $\bar{v}$ to be $\theta c$; then:

$$\bar{o}.\bar{v} = \cos \theta a, \quad \text{(Eq. XV-16a)};$$

$$\bar{y}.\bar{v} = \cos \theta b, \quad \text{(Eq. XV-16b)};$$

$$\bar{n}.\bar{v} = \cos \theta c, \quad \text{(Eq. XV-16c)}.$$

These angles are three direction cosines of $\bar{v}$ (the unit vector of $\bar{V}t$) with the three orthogonal unit vectors $\bar{o}$ and $\bar{y}$ and $\bar{n}$, and:

$$\cos^2 \theta a + \cos^2 \theta b + \cos^2 \theta c = 1, \quad \text{(Eq. XV-17)}.$$

Rewriting (XV-15) in terms of (XV-16) and (XV-17):

$$\overline{W}op^2 = (S \text{ minor})^2 \frac{\cos^2\theta c}{\sin^2\theta a}, \quad \text{(Eq. XV-18)};$$

$$|\overline{W}op| = (S \text{ minor}) \frac{\cos^2\theta c}{\sin^2\theta a}, \quad \text{(Eq. XV-19)}.$$

Substituting (XV-17 into (XV-3):

$$\theta o \cong \tan (\theta o) = Won = \frac{\overline{W}op}{D} = \frac{(S \text{ minor})}{D} \cdot \frac{\cos \theta c}{\sin \theta a}, \quad \text{(Eq. XV-20)}$$

where D id the absolute value of $\bar{V}t$. A similar expression for $\overline{W}y$, the dimension of projected face 1010p which is perpendicular to unit vector $\bar{y}p$ in the plane of $\bar{o}p:\bar{y}p$ (projection plane 260):

$$\theta y \cong \tan (\theta y) = Wyn = \frac{\overline{W}y}{D} = \frac{(S \text{ major})}{D} \cdot \frac{\cos \theta c}{\sin \theta b}, \quad \text{(Eq. XV-21)}.$$

$\theta$ min is the lesser of $\theta o$ or $\theta y$.

Application of (XV-21) in resolvability testing stage 58 requires the following elementary vector algebra relationships:

$$D^2 = (\bar{V}t.\bar{V}t) \text{ from which } D = (\bar{V}t.\bar{V}t)^{\frac{1}{2}}, \quad \text{(Eq. XV-22)};$$

$$\bar{V}t \cdot \bar{o} = -D \cos \theta a \text{ from which } \cos \theta a = -\frac{\bar{V}t \cdot \bar{o}}{D}, \quad \text{(Eq. XV-23)};$$

$$\text{and } \sin \theta a = (1-\cos^2 \theta a)^{\frac{1}{2}}, \quad \text{(Eq. XV-24)};$$

$$\bar{V}t \cdot \bar{n} = -D \cos \theta c \text{ from which } \cos \theta c = -\frac{\bar{V}t \cdot \bar{n}}{D}, \quad \text{(Eq. XV-25)}.$$

FOUR RESOLVABILITY CLASSES

As each object face is tested for resolvability it is treated with one of four sets of correction factors (see FIG. 12 flow chart) depending whether the minimum distance (D min) from origin 220 to the closest vertex on the face is:

Class I: D min = $V_t$ = D, (see FIG. 11A);
Class II: D > D min > D min of Class III, (see FIG. 11B);
Class III: D min = D sin $\theta a$, (see FIG. 11C);
Class IV: D min ≅ D, (treated as Class I). The classification of a particular face will change as aircraft 14 moves relative to the face. The classification is made on a real tome basis using the current aircraftto-face relationships outlined in the flow chart of FIG. 12.

CLASS I (FACE TILTED AWAY FROM $\overline{V}t$)

Figure 11A:
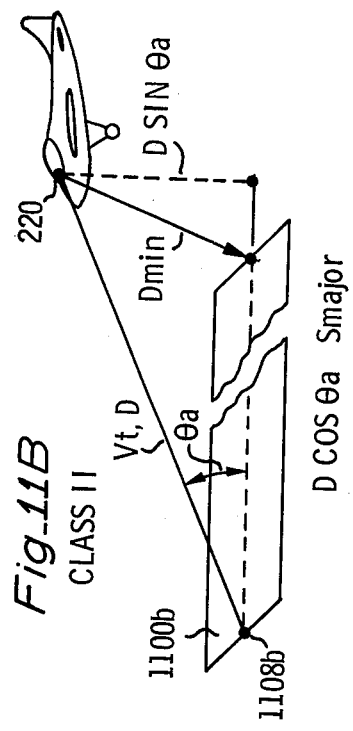
FIGS. 11A, 11B, 11C and 11D, are perspective diagrams showing the classes of positional relationships between the observer and an object face along the reference vertex.

Class I concerns polygon face 1100a of FIG. 11A in which reference vertex 1108a is on the side of the polygon that is close to origin 220. A Class I configuration exists when aircraft 14 is on the approach to the runway (face 1100a) for landing. Face 1100a by definition tilts away from Vt and the orientation angle, $\theta a$, is greater than 90°, that is:

$$\cos \theta a = -\frac{\overline{V}t \cdot \overline{o}}{D} > 0, \qquad \text{(Eq. XV-26)}.$$

In Class I the dot product of $\overline{V}t$ and $\overline{o}$ has a negative sign. $|\overline{V}t|$ in Class I is identical to D min:

$$D \min = |\overline{V}t| = D, \text{ and } \frac{D \min}{D} = 1, \qquad \text{(Eq. XV-27)}.$$

CLASS II (FACE TILTED TOWARD Vt)

Figure 11B:
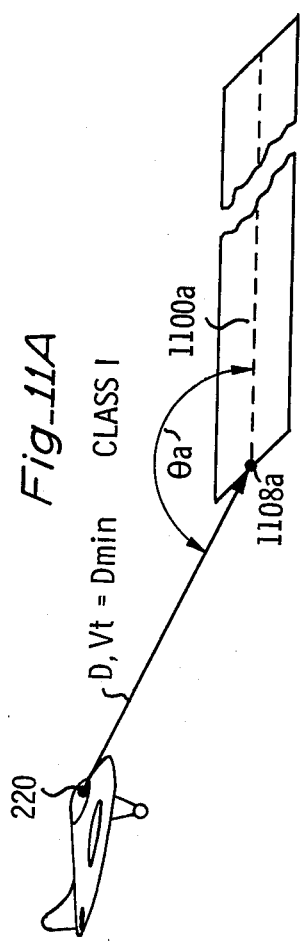

Class II concerns polygon face 1100b of FIG. 11B in which reference vertex 1108b is on the side of the polygon that is remote from origin 220. A Class II configuration exists when aircraft 14 is on the approach to the runway (face 1108b) for landing in the opposite direction as in FIG. 11A. Face 1100b by definition tilts toward $\overline{V}t$ and the orientatin angle $\theta a$ is less than 90°, that is (from Eq. XV-23):

$$\cos \theta a = -\frac{\overline{V}t \cdot \overline{o}}{D} \leq 0, \qquad \text{(Eq. XV-28)}.$$

In Class II the dot product of $\overline{V}t$ and $\overline{o}$ has a positive sign. In addition, D min from aircraft 14 runway face 1108b is greater than the distance -rom origin 220 to the plane of runway face 1100b:

$$D \min > D \sin \theta a \text{ and } \frac{D \cos \theta a}{S \text{ major}} > 1, \text{ and} \qquad \text{(Eq. XV-29)};$$

$$\frac{D \min}{D} = \left[ 1 - \frac{S \text{ major}}{D} 2 \cos \theta a \left( 1 - \frac{S \text{ major}}{D \cdot 2 \cos \theta a} \right) \right]^{-\frac{1}{2}}, \qquad \text{(Eq. XV-30)}.$$

CLASS III (OBSERVER OVER FACE)

Figure 11C:
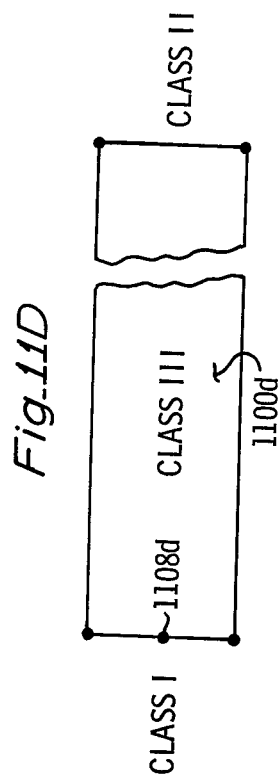
Figure 11D:
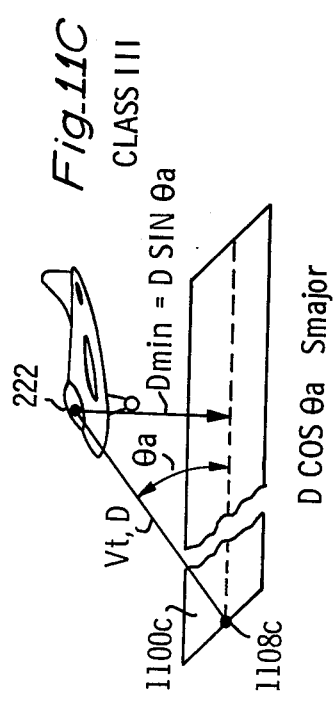

Class III concerns polygon face 1100c of FIG. 11C in which the orientation angle $\theta a$ is less than 90° ($\cos \theta a = \overline{V}t \cdot \overline{o}/D$ is less than or equal to zero), but face 1100c is close enough so that D min is perpendicular to the face. A Class III configuration exists when aircraft 14 is directly over the runway face 1100c. D min to face 1100c intersects face 1100c and:

D min = D sin $\theta a$;

and D min/D = sin $\theta a$, \qquad (Eq. XV-31);

and D cos $\theta a$/S major < 1, \qquad (Eq. XV-32).

CLASS IV (DISTANT AND OR SMALL FACE)

Class IV concerns a Class II face ($\theta a$ less than 90°) which is very far away or has a very small Sp major, creating a situation where D min is almost identical to D; and $$1 << \frac{D \cos \theta a}{S \text{ major}} \leq 128, \qquad \text{(Eq. XV-33)}.$$

The value of 128 is a workable boundary between Class II and Class IV.

Now D min/D can be substituted into equations XV-20 and XV-21 to produce $\theta o$ and $\theta y$ using the minimum distance D min:

$$\theta o = \frac{S \text{ minor}}{D \min} \cdot \frac{\cos \theta c}{\sin \theta a} = \frac{S \text{ minor}}{D} \cdot \frac{\cos \theta c}{\sin \theta a} \cdot \frac{D}{D \min}, \qquad \text{(Eq. XV-34)};$$

$$\theta y = \frac{S \text{ major}}{D \min} \cdot \frac{\cos \theta c}{\sin \theta b} = \frac{S \text{ major}}{D} \cdot \frac{\cos \theta c}{\sin \theta b} \cdot \frac{D}{D \min}, \qquad \text{(Eq. XV-35)}.$$

FLOW CHART

Figure 12:
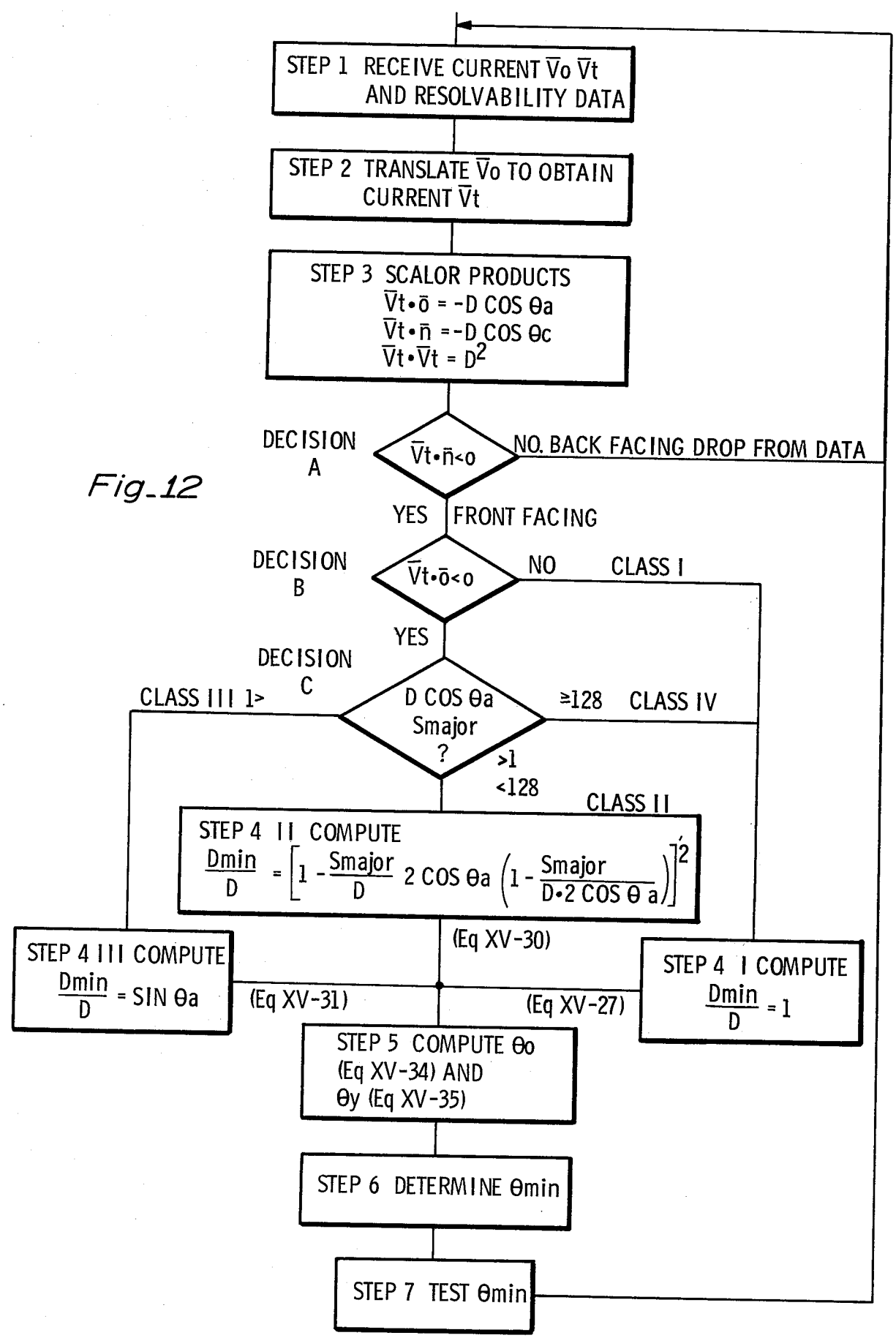
FIG. 12 is a flowchart of the operation of resolvability stage 58.

The flow chart of FIG. 12 outlines the operation of resolvability testing stage 58. First the reference vertex $\overline{V}o$ for the current face is received (Step 1) and translated (Step 2) to provide the current $\overline{V}t$. During Step 3 certain scalor products are completed using the $\overline{V}t$ of Step 2 and $\overline{o}$ and $\overline{n}$ from the resolvability data accompanying each face. Decision A is the normal test in which $\overline{V}t \cdot \overline{n}$ is examined to determine which faces have a $\theta c$ of greater than 90° and are therefore back facing. If $\overline{V}t \cdot \overline{n}$ is less than zero then $\cos \theta c$ is positive (see Eq.XV-23) and the face is front facing. If $\overline{V}t \cdot \overline{n}$ is equal or greater than zero then $\cos \theta c$ is zero or negative and the face is side or back facing and is dropped from the image data flow. Decision B is the orientation test in which $\overline{V}t \cdot \overline{o}$ is examined (See Eq. XV-21) to separate Class I faces ($\theta a$ greater than 90°) from Class II, III, and IV ($\theta a$ less than 90°). Decision C distinguishes between Class II and Class III and Class IV.

CIRCUIT OPERATION (DETAILED DESCRIPTION)

FIG. 13 shows a block diagram of an embodiment of resolvability stage 58 for accomplishing the resolution test as outlined in the flowchart of FIG. 12. The current Vp, Vo, and resolvability data, ($\overline{n}$, $\overline{o}$, Log S major, and Log S minor, and $\theta rc$) enters resolvability stage 58 on data bus 307 in response to the LRD (14) instruction (see Section VI).

Resolvability Data RAM 1304 may be a random access memory (a set of 74S189) similar to RAM 350 in translation stage 60 for loading and recalling Vp, Vo, and the RD data as required.

Translation stage 1310 may be similar to translation stage 60 for calculating the current Vt (Vt=Vo−Vp).

Dot product circuits 1314, 1316, and 1318 may be the same as the multiplying hardware in rotation stage 62.

Log converter 1320 may be the convertor device discussed in U.S. Pat. No. 4,078,250, entitled "Log-Antilog Conversion for a Digital Radar System" which issued on Mar. 7, 1978 to David F. Windsor and Kanwalnain S. Rekhi.

Right shifter 1324 may be affected by right shifting the wiring between log converter 1320 and subtractors 1328 and 1330 by one place for dividing Log $D^2$ in half to provide Log D.

Subtractor 1328 may be two 20 bit subtractors (five adders 74S283 with inverters 74S04) for dividing S major and S minor by D.

Subtractor 1330 may be two 20 bit subtractors (five adders 74S283 with inverters 74S04) for dividing D cos $\theta a$ and D cos $\theta c$ by D.

Normal tets 1334 may be a one bit flipflop (74S74) for providing BACKFACING signal logic 70 when the sign of $(-D \cos \theta c)$ is positive. Orientation test 1336 may be a one bit flopflop (74S74) for providing CLASS I to input processor 1342.

Subtractor 1338 may be a 20 bit subtractor (five 74S283s with inverters 74S04) for dividing D cos $\theta a$ by S major. Class test 1340 may be a one bit flipflop (74S74) for providing CLASS III when the sign of Log (D cos $\theta a$/S major) is negative, and a four bit comparator (74S85) for providing CLASS IV when Log (D cos $\theta a$/S major) is greater than 8 and for providing CLASS II for intermediate values.

Log processor 1342 receives the four inputs Log cos $\theta c$, Log cos $\theta a$, Log (S major/D), and Log (S minor/D), and the CLASS flags for calculating D min/D (Eq. XV-27, Eq. XV-30, and Eq. XV-31) for classes I-IV. Log processor 1342 may employ $1-x$ and $1+x$ lookup tables.

Comparator 1346 may be a 20 bit comparator (five 74S85s) for determining whether $\theta$ min $< \theta$rc.

I claim as my invention:

1. An image system for providing selected image data to a display device which displays polygon object faces as viewed from an observation point in simulated relative motion with the polygon object faces, by combining object data defining the positions of the vertices of the polygon object faces with the observer data defining the position and orientation of the observation point relative to the object faces, and eliminating the data representing polygon object faces having a display size less than a minimum predetermined size, the image system comprising:
   object data base means for providing the object data;
   resolution standard means for defining the minimum predetermined size;
   resolvability means responsive to the object data and to the observer data for determining the display size of each polygon face, and responsive to the resolution standard means for eliminating from the flow of the object data representing polygon faces the data representing those faces having a size less than the minimum predetermined size; and
   image data processing means responsive to the polygon object data remaining in the flow of object data and to the observer data, for providing control signals and display data to the display device.

2. The image system of claim 1, wherein:
   the resolution standard means provides minimum predetermined angular subtense $\theta$rc for defining the predetermined minimum size; and
   the resolvability means determines the display size of each polygon face by calculating the display angular subtense thereof as viewed from the observation point, and eliminates the data representing polygon faces having a display angular subtense less than the minimum predetermined angular subtense $\theta$rc.

3. The image system of claim 2, wherein each object face has resolvability data associated therewith including a rectangle the long side of which is equal to the major dimension ($\overline{S}$ major) of the object face and the short side of which ia equal to the minor dimension ($\overline{S}$ minor) of the object face perpendicular to the major dimension.

4. The image system of claim 3, wherein:
   the resolvability means determines the display angular subtense ($\theta$ major) of the major dimension ($\overline{S}$ major) of each polygon face, and determines the display angular subtense ($\theta$ minor) of the minor dimension ($\overline{S}$ minor) of each face, and compares the lessor of the two, $\theta$ min, with the angular subtense $\theta$rc for eliminating polygon faces having a $\theta$ min which is less than $\theta$rc.

5. The image system of claim 4, wherein:
   the resolvability data associated with each face includes data representing $\theta$rc for that face.

6. The image system of claim 1, wherein:
   the object data for each polygon face includes the following items of resolvability data:
   S major—the longest dimension of the face,
   S minor—the dimension of the face which is perpendicular to S major,
   $\overline{o}$—a unit orientation vector in the plane of the face and extending in the direction of S major, and
   $\overline{n}$—a unit normal vector extending from the plane of the face.

7. The image system of claim 6, wherein:
   each face has an initial vertex Vo which forms the starting point of $\overline{o}$ and $\overline{n}$.

8. The image system of claim 7, wherein:
   the resolvability means makes the following calculation for each face:

$$\overline{Vt}.\overline{n} = D \cos \theta c,$$

where Vt is the vector from the observer to the initial vertex Vo of that face, and D is $|Vy|$, and $\theta c$ is the angle between Vt and $\overline{n}$.

9. The image system of claim 8, wherein:
   the resolvability means includes a normal test circuit which provides a signal to the image data processing means to eliminate that face from the data flow when the sign of D cos $\theta c$ is negative indicating that $\theta c$ is greater than 90° and the face is backfacing.

10. The image system of claim 7, wherein:
    the resolvability means makes the following calculation for each face:

$$\overline{Vt}.\overline{o} = D \cos \theta a,$$

where Vt is the vector from the observer to the initial vertex Vo of that face, and D is $|Vt|$ and $\theta a$ is the angle between Vt and $\overline{o}$.

11. The image system of claim 10, wherein:
    the resolvability means includes an orientation test circuit for determining whether the sign of D cos $\theta a$ for each face is negative indicating that $\theta a$ is greater than 90° and $$D = D \text{ min},$$

where D min is the minimum distance between the observer and that face.

12. The image system of claim 11, wherein:
    the resolvability means calculates the following ratio for each face in which the sign of D cos $\theta a$ is positive:

$$D \cos \theta a/S \text{ major},$$

where D is the distance from the observer to the initial vertex Vo of each face.

* * * * *